US011885153B2

(12) United States Patent
Liao

(10) Patent No.: US 11,885,153 B2
(45) Date of Patent: Jan. 30, 2024

(54) DOOR LOCK WITH ENERGY SAVING DEVICE

(71) Applicant: Li-Shih Liao, Taoyuan (TW)

(72) Inventor: Li-Shih Liao, Taoyuan (TW)

( * ) Notice: Subject to any disclaimer, the term of this patent is extended or adjusted under 35 U.S.C. 154(b) by 22 days.

(21) Appl. No.: 17/809,360

(22) Filed: Jun. 28, 2022

(65) Prior Publication Data

US 2022/0412123 A1 Dec. 29, 2022

(30) Foreign Application Priority Data

Jun. 29, 2021 (TW) ................................ 110207553

(51) Int. Cl.
*E05B 47/00* (2006.01)

(52) U.S. Cl.
CPC .. *E05B 47/0002* (2013.01); *E05B 2047/0065* (2013.01); *E05B 2047/0068* (2013.01)

(58) Field of Classification Search
CPC ......... E05B 47/0002; E05B 2047/0065; E05B 2047/0068
See application file for complete search history.

(56) References Cited

U.S. PATENT DOCUMENTS 5,897,149 A * 4/1999 Frolov .................. E05C 19/166 292/144
6,007,119 A * 12/1999 Roth ..................... E05C 19/166 292/DIG. 65
6,053,546 A * 4/2000 Frolov .................. E05C 19/166 292/144
6,609,738 B1 * 8/2003 Roth ..................... E05B 65/108 292/144
7,825,801 B2 * 11/2010 Woods ................... H01H 3/161 340/545.1
8,292,337 B2 * 10/2012 Chang ................... E05C 19/166 70/277
8,820,803 B2 * 9/2014 Hunt ..................... E05B 65/108 292/DIG. 65
9,341,007 B2 * 5/2016 Liao ...................... E05C 19/166
2004/0026933 A1 * 2/2004 Smith ................... E05C 19/166 292/251.5
2004/0041414 A1 * 3/2004 Mandall ................ E05C 19/166 292/251.5
2013/0168976 A1 * 7/2013 Liao ...................... E05C 19/166 292/251.5
2013/0229020 A1 * 9/2013 Liao ...................... E05C 19/166 292/251.5
2014/0159388 A1 * 6/2014 Liao ...................... E05C 19/166 292/251.5

* cited by examiner

*Primary Examiner* — Mark A Williams
(74) *Attorney, Agent, or Firm* — Rosenberg, Klein & Lee

(57) ABSTRACT

A door lock with an energy-saving device, comprising: an electromagnet assembly secured on the door frame, which has an electromagnet and a control circuit board, and an adsorption assembly secured on the door board, which has a positioning unit and an iron plate, a set of linkage sensing mechanism set on the electromagnet, and a set of clutch mechanism set on the adsorption assembly; Thereby, when close the door board into the door frame, the control circuit board supplies power to the electromagnet with the high current in the normal locking mode to attract iron plate, and then, the clutch mechanism drives the linkage sensing mechanism to act, triggering the control circuit board to supply power with low current in the power-saving lock mode to maintain the closed state of the door panel.

7 Claims, 19 Drawing Sheets

40

DOOR LOCK WITH ENERGY SAVING DEVICE

BACKGROUND OF THE INVENTION

1. Field of the Invention

The invention relates to a lock structure, especially to a door lock with an energy-saving device is provided with a linkage sensing mechanism to trigger the control circuit board to supply power, thereby achieving energy-saving and control effects on abnormal external forces.

2. Description of the Related Art

The use of electromagnetic door locks has become very common in security system; Referring to FIG. 1, most of the current electromagnetic door locks 10 adopt the structure of the electromagnet 11 and the adsorption iron plate 12. The electromagnet 11 is installed on the door frame 13, and the adsorption iron plate 12 is installed relative to the door plate 14. When the electromagnet 11 is energized, the electromagnetic suction force will attract the adsorption iron plate 12, and the electromagnetic door lock 10 will form a locking mod. When the electromagnet 11 is powered off, the electromagnetic suction force disappears, and the suction iron plate 12 can be separated from the electromagnet 11, and the electromagnetic door lock 10 forms an unlocking mode. Patents of this type are disclosed in U.S. Pat. No. 4,652,028 and others.

However, the general power consumed by the DC-powered electromagnetic door lock 10 is about several watts (W) to dozens of watts. If the DC power supply is 12 volts (V), it will keep consume hundreds of milliamps (mA). Therefore, based on the limitations of the electromagnetic door lock 10 design, a lot of electrical energy will be consumed.

Furthermore, the security system is widely used with electromagnetic door locks, and environmental protection and energy saving are the development trends of the world. Therefore, the design of electromagnetic locks in energy saving needs to be further improved.

SUMMARY OF THE INVENTION

It is a primary objective of the present invention to provide the electromagnetic door lock in a low-energy-consuming adsorption mode when it is in a normal state, when there is an abnormal external force, the sensor is triggered, so that the electromagnetic door lock can quickly respond to switch to the normal locking mode to resist the external force, so that the present invention can achieve the functions of energy saving an and external force detection and control.

In order to achieve the above objectives, the present invention comprise: an electromagnet assembly, an adsorption assembly, a linkage sensing mechanism and a clutch mechanism; wherein the electromagnet assembly have a locking recess, an electromagnet and a control circuit board, the locking recess is secured in a door frame, the electromagnet has a through hole which is set inside the locking recess, the control circuit board is arranged inside a containing space of the locking recess, using a wire to connect an external power supply, and electrically connected to the electromagnet; the adsorption assembly having a positioning unit and an iron plate, the positioning unit is for securing on a door board, the iron plate has a slot which is pivoted on the positioning unit; the linkage sensing mechanism is arranged in the through hole of the electromagnet, having a mandrel, a compression spring assembly, a power switch button and a button circuit board, wherein the bottom of the power switch button has at least one conductive sheet assembly, the top edge of the control circuit board has a least one contact form an open loop and electrically connected to the control circuit board, the mandrel has an ejector head and a flange, the mandrel is enable to axially slide in the through hole of the electromagnet, the ejector head is set through the external side of the electromagnet, the flange is enable to compress the compression spring assembly to make it axial stretch, when the mandrel is sliding inward, urging the flange to compress the compression spring assembly to force the power switch button to move towards the direction of the button circuit board, so the conductive sheet assembly will contact the contact of the button circuit board to form a close loop, and when the mandrel is sliding outward, the compression spring assembly rebound to force the power switch button to move away from the direction of the button circuit board, so the conductive sheet assembly will separate from the contact of the button circuit board to form an open loop; the clutch mechanism is assembled in the adsorption assembly corresponding to the linkage sensing mechanism, having a positioning screw and a spring, the spring is assembled in the slot of the iron plate, and the positioning screw set through the spring and is screwed with the positioning unit, so that the positioning unit is enable to displace toward the opposite direction of the iron plate under the action of external force, and drive the positioning screw to compress the spring, and when the external force disappears, the spring will rebound and drive the positioning unit to return to its original position.

The operation of the door lock consists of the following steps:

Step a). Start the normal locking mode: when closing the door board to the door frame, the control circuit board supplies power to the electromagnet with the high current of the normal locking mode to attract the iron plate;

Step b). Start the power-saving locking mode, the clutch mechanism will drive the linkage sensing mechanism to act, and trigger the control circuit board to change the power supply to the electromagnet with the low current of the power-saving locking mode to maintain the closed state of the door board;

Step c). When the abnormal external force acts on the door board, the positioning unit of the clutch mechanism is pushed, and the power switch button of the linkage sensing mechanism is driven to move away from the button circuit board, so that the contact of the button circuit board forms an open loop, the control circuit board is triggered to supply the electromagnet with the high current of the normal locking mode to resist the external force;

Step d). When the abnormal external force disappears, the positioning unit of the clutch mechanism is moved back to its original position making the power switch button of the linkage sensing mechanism move toward the direction of the button circuit board, so that the contact of the button circuit board forms a closed loop, and the control circuit board will restore the low current power supply to the electromagnet in the power-saving locking mode, so that the door board continues to maintain the closed state.

Also, the present invention including a first type flexible body, the first type flexible body has a ring seat, the center of the ring seat has an axial column which is dangly, and the conductive sheet assembly which arranged at the bottom of the axial column and the ring seat is composed of a first conductive sheet and a second conductive sheet annularly arranged on the outer periphery of the first conductive sheet, and the upper end of the first type flexible body is provided with a first pushing surface and a second pushing surface which are respectively located at the top of the axial column and the ring seat; the compression spring assembly is composed of a first compression spring and a second compression spring annularly arranged on the outer periphery of the first compression spring, its one end is against the outer periphery of the flange of the mandrel, and the other end is against the first pushing surface and the second pushing surface; when the mandrel is sliding inward in the through hole, urging the flange to compress the first compression spring and second compression spring to force the ring seat and the axial column of the first type flexible body to move inwards, so as to make the second conductive sheet and the first conductive sheet successively contact the second contact and the first contact on the upper edge of the button circuit board; and when the mandrel is sliding outward in the through hole, make the flange to against the top end of a second through hole, and the first compression spring and second compression spring rebound to force the axial column of the first type flexible body to move outwards, so as to make the first conductive sheet firstly separate from the contact between the first contact of the button circuit board to form an open loop.

Also, the present invention including a second type flexible body, the second type flexible body has a ring seat, the center of the ring seat has an axial column which is dangly, and the conductive sheet assembly which arranged at the bottom of the axial column and the ring seat is composed of a first conductive sheet, and the upper end of the second type flexible body is provided with a first pushing surface located at the top of the axial column; the compression spring assembly is composed of a first compression spring, its one end is against the outer periphery of the flange of the mandrel, and the other end is against the first pushing surface; when the mandrel is sliding inward in the through hole, urging the flange to compress the first compression spring to force the second type flexible body to move toward the direction of button circuit board, so as to make the first conductive sheet contact the first contact of the button circuit board to form a close loop; and when the mandrel is sliding outward in the through hole, the first compression spring rebound to force the second type flexible body to move away from the direction of button circuit board, so as to make the first conductive sheet separate from the contact between the first contact of the button circuit board to form an open loop.

Also, wherein the positioning unit is a positioning seat, the positioning seat is secured at the inner side of the door board, the positioning screw is set through the spring and screwed with the positioning seat, and make the iron plate pivot to the outer periphery of the positioning seat, moreover, wherein the clutch mechanism further comprise an elastic body arranged between the positioning seat and the iron plate, and after the positioning screw is set through the spring, the positioning screw is further set through the elastic body and then screwed with the positioning seat, so as to make the elastic body has both buffering and positioning effects.

Also, wherein the positioning unit is an internal screw, the internal screw is secured at the inner side of the door board, the positioning screw is set through the spring and screwed with the internal screw, and make the iron plate pivot to the outer periphery of the internal screw, moreover, wherein the clutch mechanism further comprise an elastic body arranged between the internal screw and the iron plate, and after the positioning screw is set through the spring, the positioning screw is further set through the elastic body and then screwed with the internal screw, so as to make the elastic body has both buffering and positioning effects.

With the feature disclosed above the present invention has below effects:

(1) For electromagnetic door locks that originally need continuous power supply around the clock, the clutch mechanism is combined with the linkage sensing mechanism to trigger the power supply of the control circuit board, when the normal state is reached, a low current is provided, and when an abnormal external force acts, it will quickly switch to a high current state, so as to make the electromagnetic door lock has the effect of energy saving and preventing abnormal external forces.

(2) The present invention uses a power switch button with flexibility to cooperate with the action of the compression spring assembly, thereby having the function of amplifying and buffering, and the conductive sheet assembly can precisely control its timing during the process of contacting (forming a closed circuit state) and disengaging (forming an open loop state) with the contacts of the key circuit board.

DETAILED DESCRIPTION OF THE PREFERRED EMBODIMENT

Figure 1:
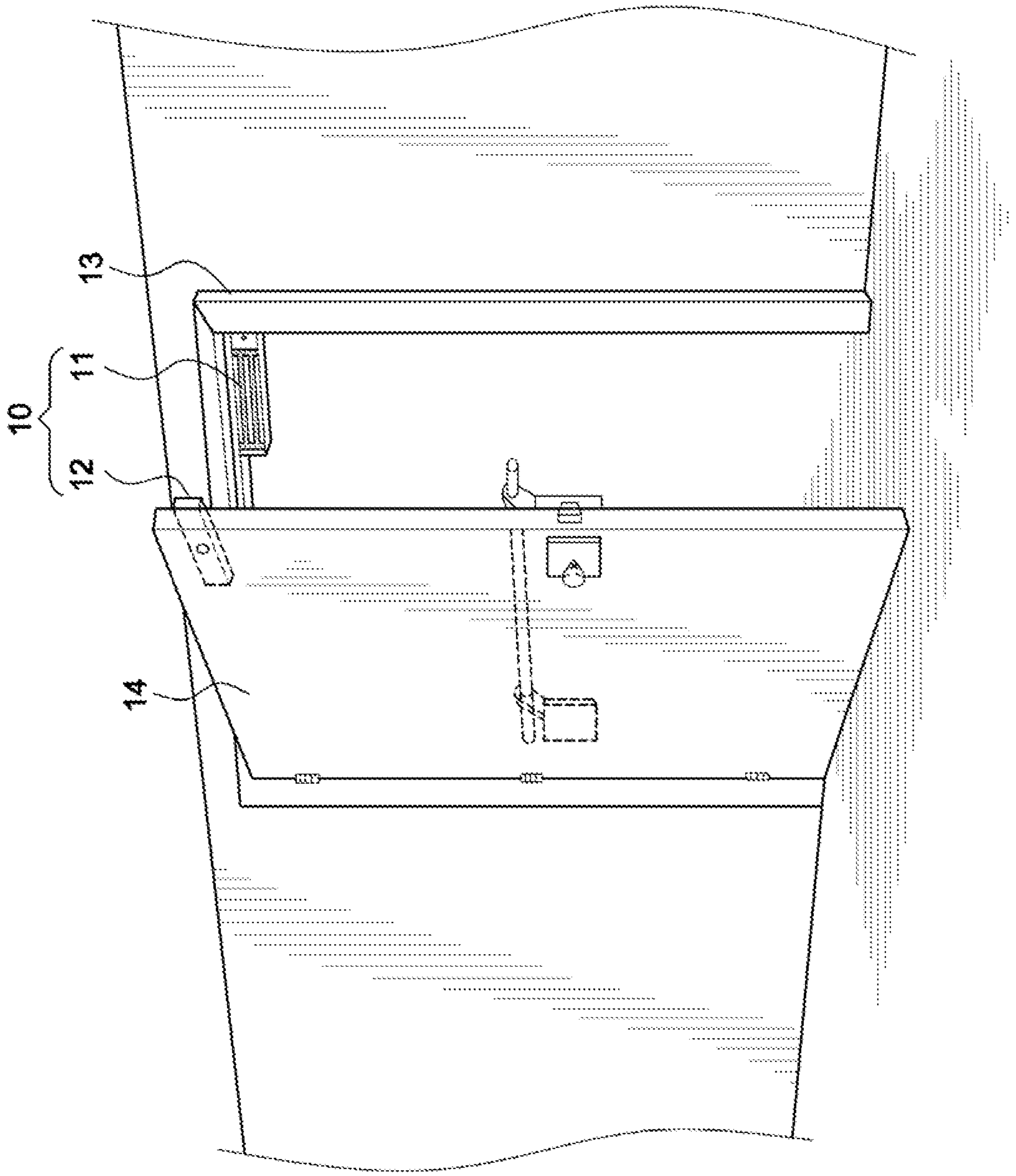
FIG. 1 PRIOR ART
FIG. 1 is a schematic diagram illustrating structure of the electric lock according to the prior art.

Referring to FIGS. 2A-4D, the door lock with energy saving device 100, including: an electromagnet assembly 20, an adsorption assembly 30, a linkage sensing mechanism 40 and a clutch mechanism 50; wherein the electromagnet assembly 220 is secured in a door frame 13, the adsorption assembly 30 is arranged on the door frame 13 accordingly, but the present invention is not limited to this application, the electromagnet assembly 220 can be secured on a door board 14, the adsorption assembly 30 can be arranged on the door board 14 accordingly. The structure detail and the means to connect to the power about electromagnet assembly 20 and the adsorption assembly 30 is belongs to the prior art, so I am not mentioned it in detail.

Figure 2A:
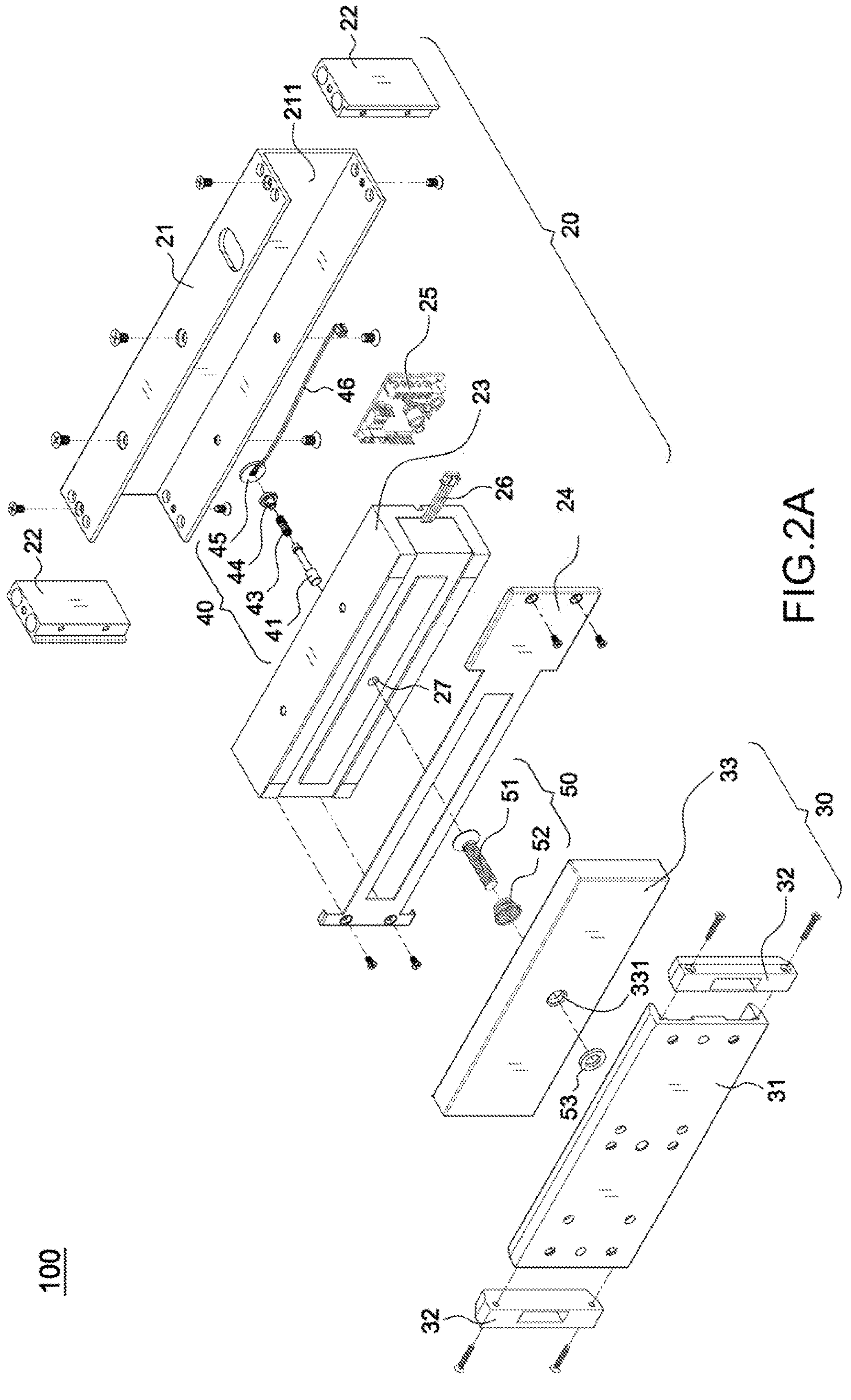
FIG. 2A is an exploded perspective views of the present invention.
Figure 2B:
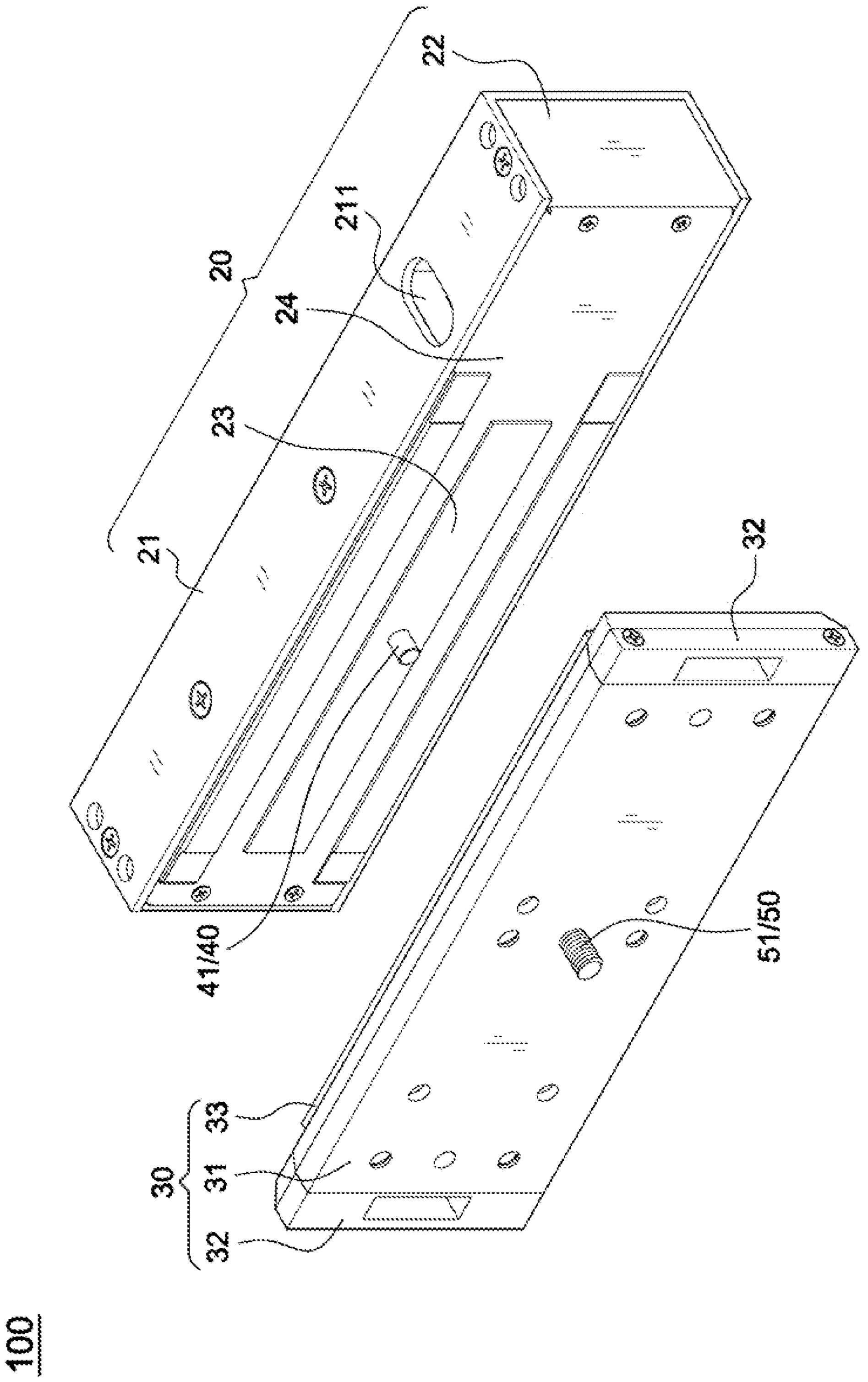
FIG. 2B is an assembly perspective views of the present invention.

The main features of the door lock with energy saving device 100, as FIGS. 2A-2B showing, wherein an electromagnet assembly 20 having a locking recess 21, two side plates 22, an electromagnet 23, a cover plate 24 and a control circuit board 25, the locking recess 21 is secured in a door frame 13, the electromagnet 23 is secured inside the locking recess 21 with the screw, the control circuit board 25 is arranged inside a containing space 211 of the locking recess 21, using a wire to connect an external power supply, the external power supply is not showing in the drawing, and using a wire 26 electrically connected to the electromagnet 23; moreover, the adsorption assembly 30 is composed of a positioning unit 31, a sideboard 32 and an iron plate 33, the positioning unit 31 is a positioning seat 31, the positioning seat 31 is for securing on a door board 14, and the iron plate 33 is pivoted on the outer periphery of the positioning seat 31; moreover, the linkage sensing mechanism 40 is arranged in the through hole 27 of the electromagnet 23, having a mandrel 41, a compression spring assembly 43, a power switch button 44 and a button circuit board 45, and the button circuit board 45 is electrically connected to the control circuit board 25 by a wire 26; moreover, the clutch mechanism 50 is assembled in the adsorption assembly 30 corresponding to the linkage sensing mechanism 40, having a positioning screw 51 and a spring 52, the spring 52 and an elastic body 53.

The installation and the normal locking mode of the present invention, as FIGS. 3A-3D showing, wherein the locking recess 21 of the electromagnet assembly 20 is secured in a door frame 13, the control circuit board 25 is arranged inside a containing space 211 of the locking recess 21, using a wire 26 electrically connected to the electromagnet 23; the adsorption assembly 30 is composed of a positioning seat 31, a sideboard 32 and an iron plate 33, and secure the positioning seat 31 on the door board 14 according to the electromagnet assembly 20; the linkage sensing mechanism 40 is arranged in the through hole 27 of the electromagnet 23, having a mandrel 41, a compression spring assembly 43, a power switch button 44 and a button circuit board 45, using a wire 46 electrically connected to the control circuit board 25, and the mandrel 41 is set through the through hole 27 of the electromagnet 23 and is enable to axially slide; moreover, the clutch mechanism 50 having a positioning screw 51 and a spring 52 assembled in the slot 331 of the iron plate 33 corresponding to the linkage sensing mechanism 40, the elastic body 53 is set between the positioning seat 31 and the iron plate 33, and the positioning screw 51 is screwed with the positioning seat 31.

Figure 3A:
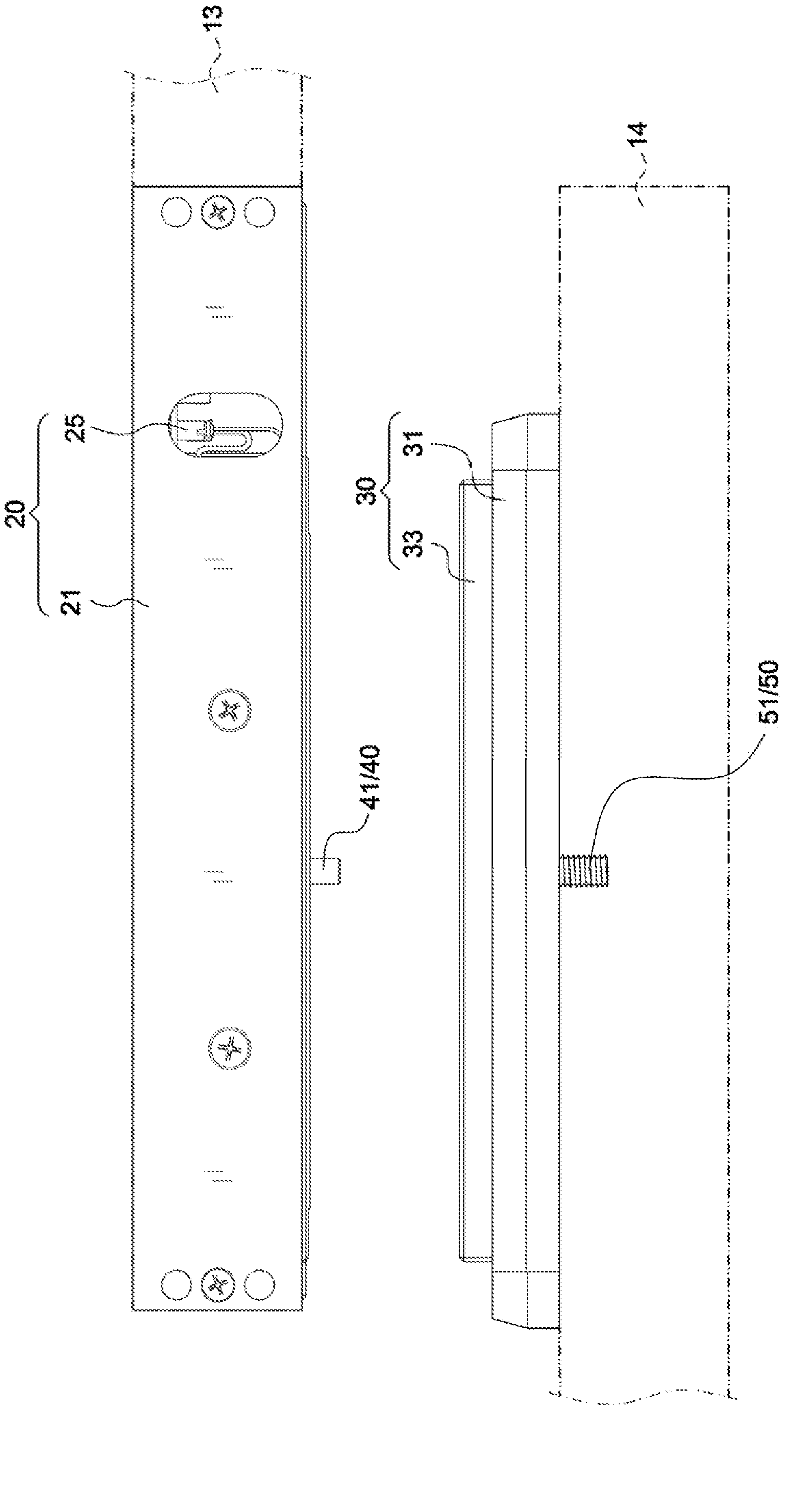
FIG. 3A is a schematic diagram illustrating the installation and the normal locking mode of the present invention.
Figure 3B:
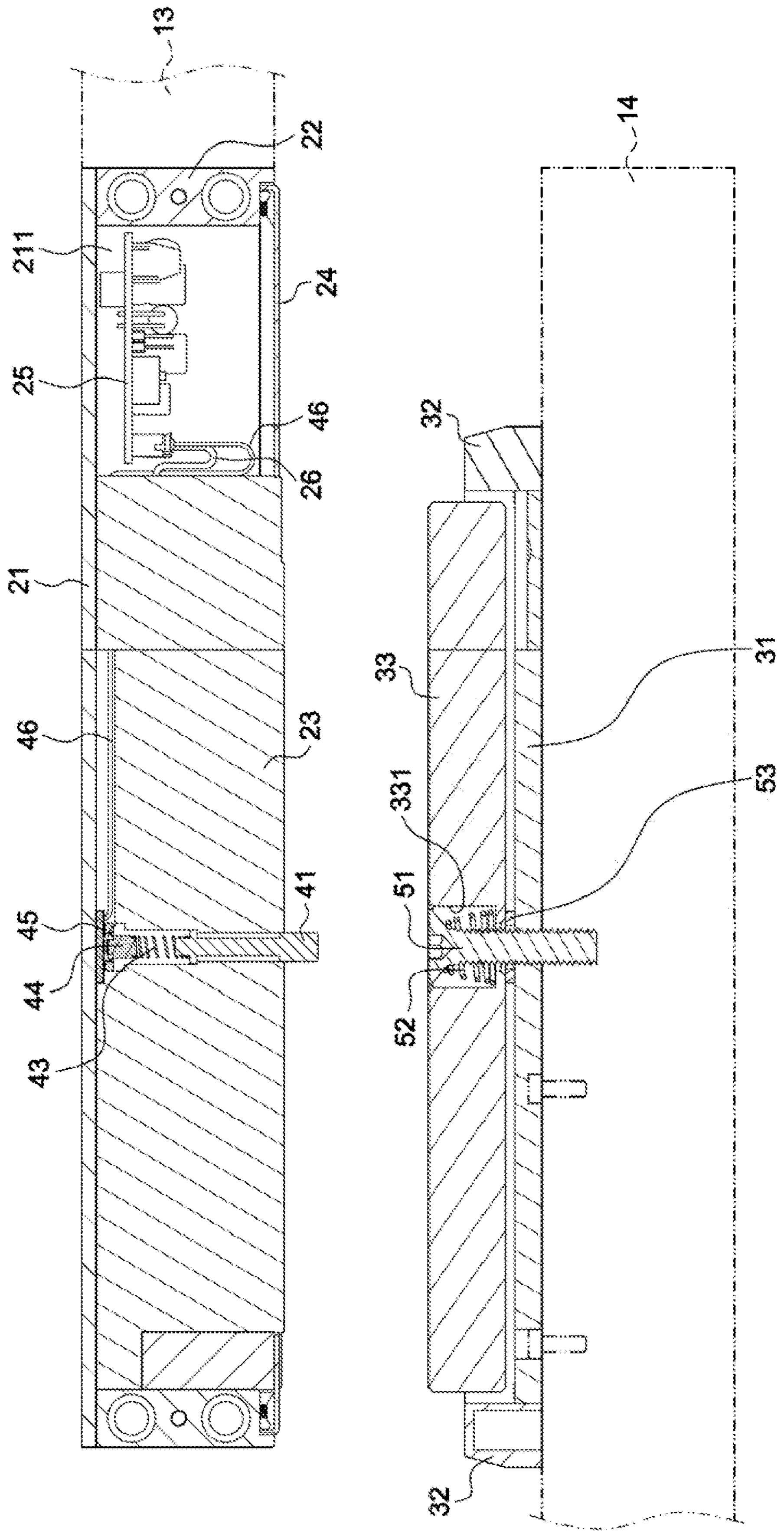
FIG. 3B is a schematic diagram illustrating the installation and the normal locking mode of the present invention.
Figure 3C:
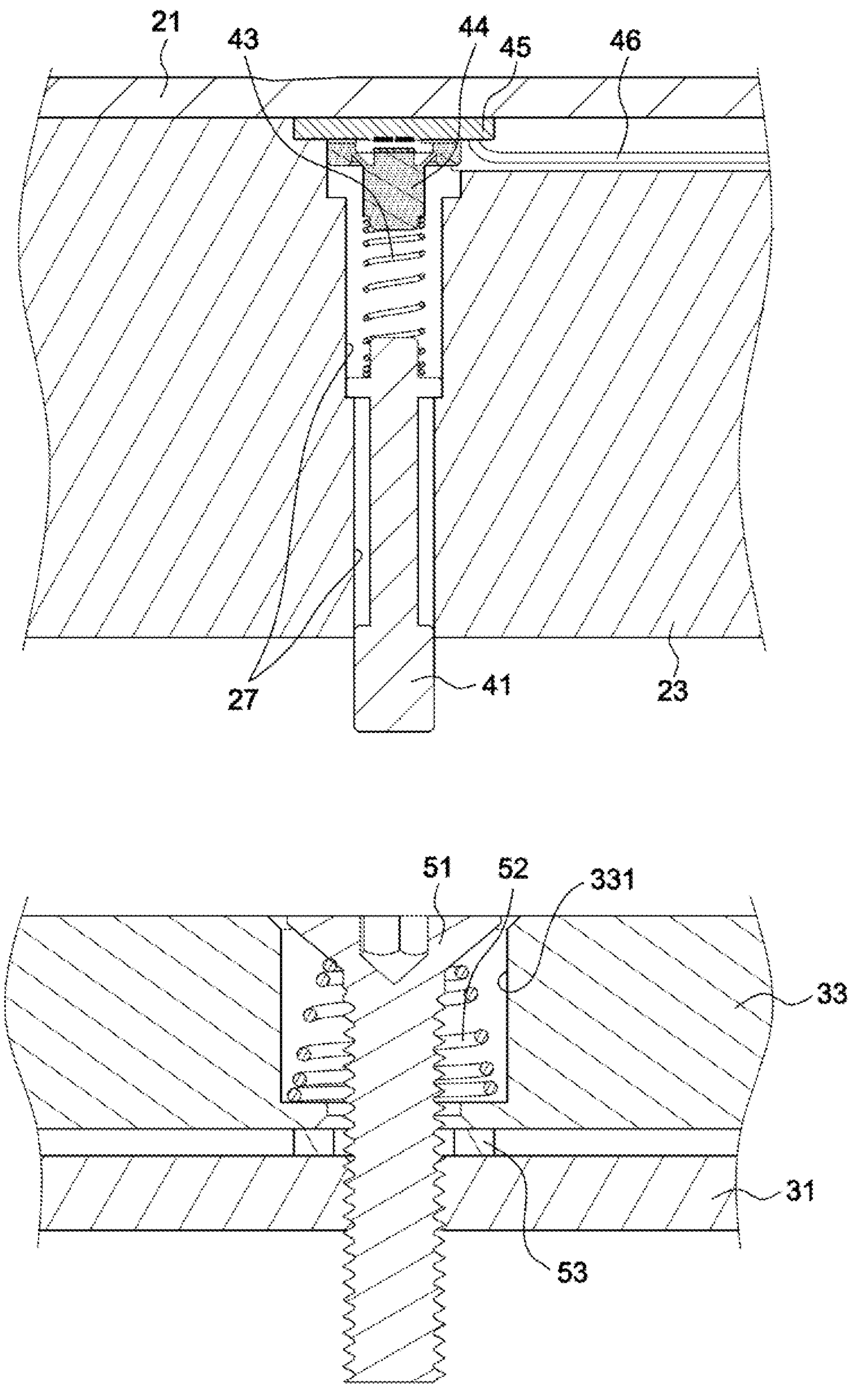
FIG. 3C is a schematic diagram illustrating the installation and the normal locking mode of the present invention.

Also, the preferred embodiment of the clutch mechanism 50 of the present invention, as FIGS. 3A-3C showing, wherein clutch mechanism 50 the spring 52 of the clutch mechanism 50 is assembled in the slot 331 of the iron plate 33, and the positioning screw 51 set through the spring 52, the slot 331 and elastic body 53 then is screwed with the positioning seat 31, so that the positioning seat 31 is enable to displace toward the opposite direction of the iron plate 33 when the door board 14 is applied with the external force, and the positioning seat 31 drives the positioning screw 51 to compress the spring 52, and when the external force disappears, the spring 52 will rebound and drives the positioning unit 31 and the door board 14 to return to its original position. The elastic body 53 have the functions of buffering and positioning relative to the positioning unit 31 and the iron plate 33, which means when the positioning unit 31 is returned to its original position by rebounding of the spring 52, the elastic body 53 can prevent the e positioning unit 31 from hitting the iron plate 33 to make a sound, and can absorb the kinetic energy of the e positioning unit 31.

Figure 3D:
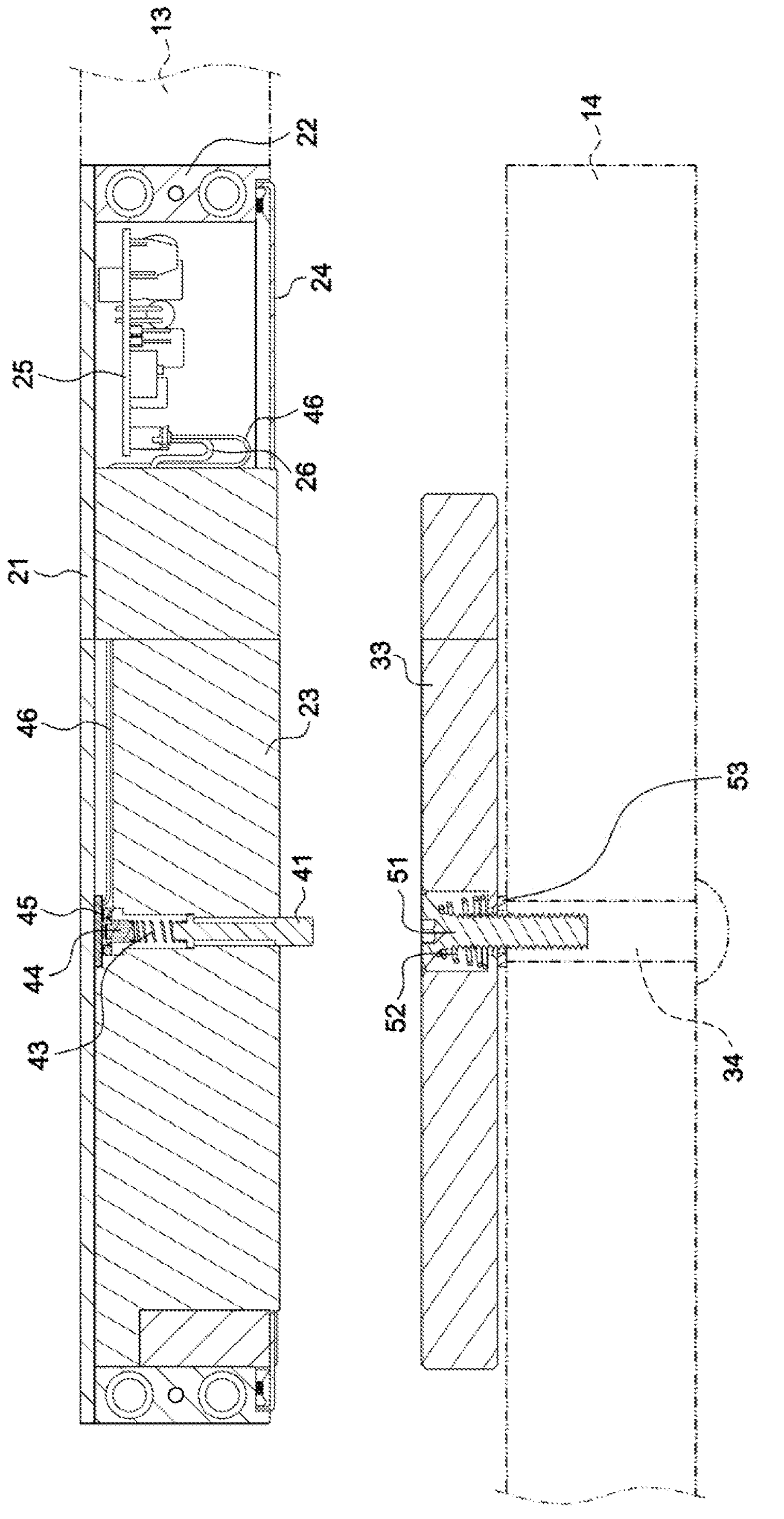
FIG. 3D is a schematic diagram illustrating the installation and the normal locking mode of the present invention.
Figure 4A:
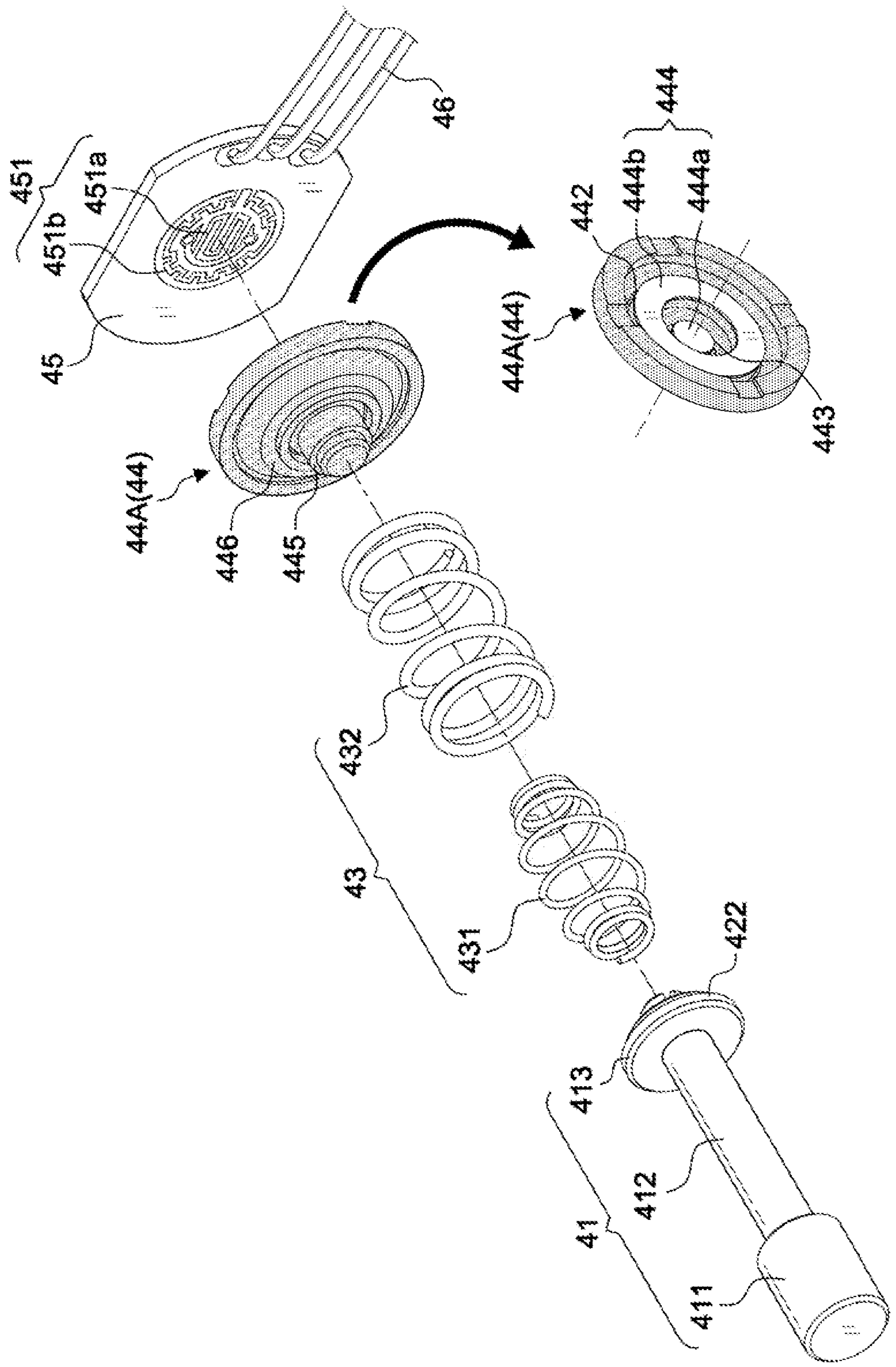
FIG. 4A is an exploded perspective views of the linkage sensing mechanism of the first embodiment of the present invention.
Figure 4B:
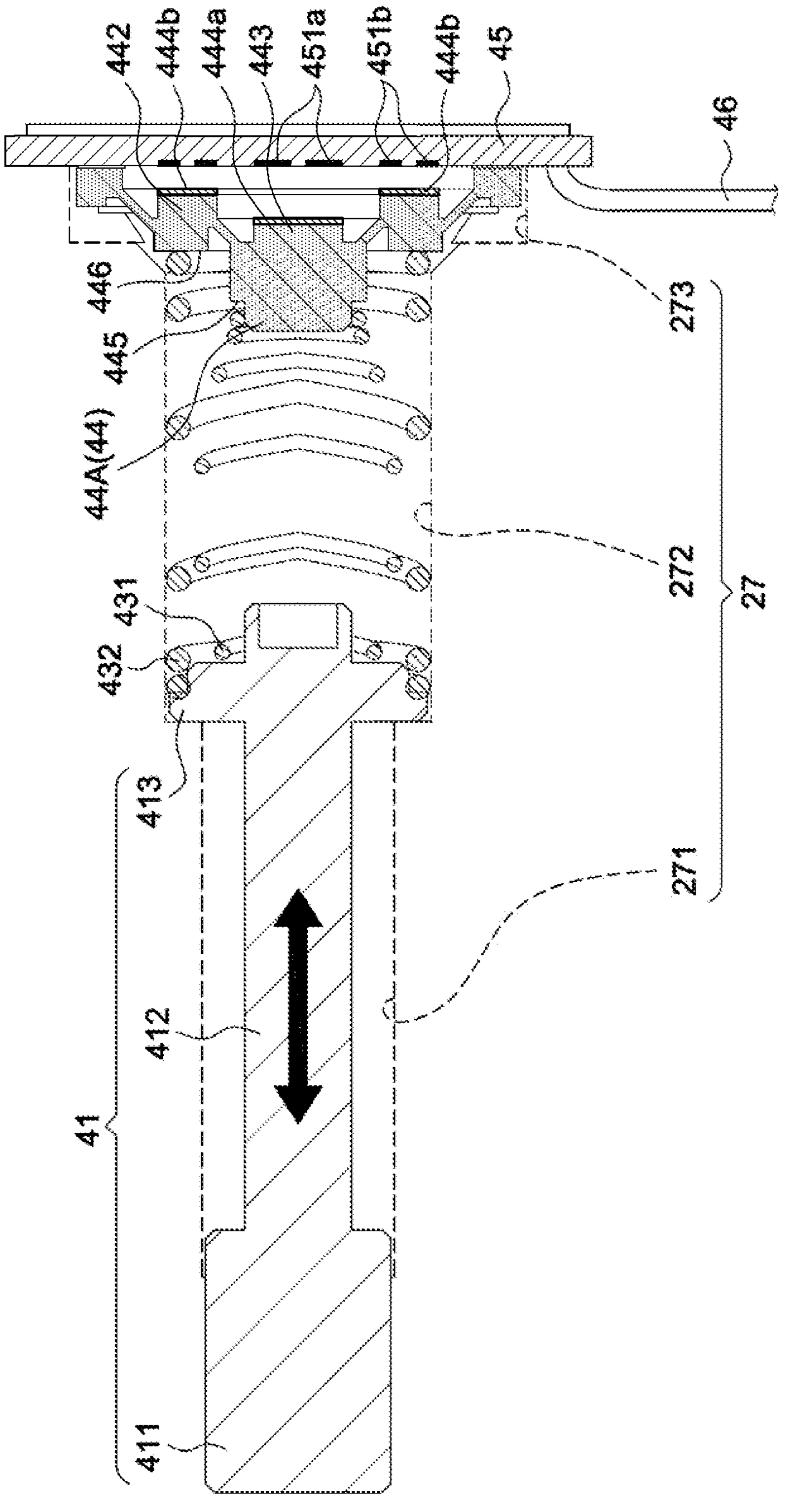
FIG. 4B is a sectional views of the linkage sensing mechanism of the first embodiment of the present invention.

The other preferred embodiment of the clutch mechanism 50 of the present invention, as FIG. 3D showing, the adsorption assembly 30 is composed of an internal screw 34 and an iron plate 33, the internal screw 34 is secured at the inner side of the door board 14, the elastic body 53 is arranged between the internal screw 34 and the iron plate 33, for having the function of buffering and positioning; the positioning screw 51 is set through the spring 52 and the elastic body 53 then screwed with the internal screw 34, making the iron plate 33 pivot at the outer periphery of the internal screw 34, and make the internal screw 34 be enable to displace toward the opposite direction of the iron plate 33 under the action of external force, and the internal screw 341 drives the positioning screw 51 to compress the spring 52, and when the external force disappears, the spring 52 will rebound and drives the internal screw 34 and the door board 14 to return to its original position. The linkage sensing mechanism 40 of the first embodiment, as FIGS. 4A-4B showing, having a mandrel 41, the compression spring assembly 43 is composed of a first compression spring 431 and a second compression spring 432 annularly arranged on the outer periphery of the first compression spring 431, the power switch button 44 is a first type flexible body 44A, and a button circuit board 45, the linkage sensing mechanism 40 is arranged in the through hole 27 of the electromagnet 23, and the through hole 27 includes a first through hole 271, a second through hole 272 and a third through hole 273; wherein the first type flexible body 44A is arranged in the second through hole 272 and the third through hole 273, has a ring seat 442 at the bottom, the center of the ring seat 442 has an axial column 443 which is dangly, and the conductive sheet assembly 444 which arranged at the bottom of the axial column 443 and the ring seat 442 is composed of a first conductive sheet 444*a* and a second conductive sheet 444*b* annularly arranged on the outer periphery of the first conductive sheet 444*a*, and the upper end of the first type flexible body 44A is provided with a first pushing surface 445 and a second pushing surface 446 which are respectively located at the top of the axial column 443 and the ring seat 442; the upper edge of the button circuit board 45 form an open loop, having a second contact 451*b* and a first contact 451*a* corresponding to the second conductive sheet 444*b* and the first conductive sheet 444*a*, and are respectively electrically connected to the control circuit board 25 by a wire 46; moreover, the mandrel 41 has an ejector head 411 and a flange 413, the mandrel 41 is enable to axially slide in the through hole 27 of the electromagnet 23, the ejector head 411 is set through the external side surface of the electromagnet 23, and can slide back and forth axially in the first through hole 271, the upper edge of the flange 413 is pressed against the top end of the second through hole 272, and the lower edge of the flange 413 presses the first compression spring 431 and the second compression spring 432 to press the first pushing surface 445 and the second pushing surface 446 respectively, and make it enable to extend and retract axially in the second through hole 272; when the mandrel 41 is sliding inward in the through hole 27, urging the flange 413 to compress the first compression spring 431 and second compression spring 432 to force the ring seat 442 and the axial column 443 of the first type flexible body 44A to move inwards, so as to make the second conductive sheet 444*b* and the first conductive sheet 444*a* successively contact the second contact 451*b* and the first contact 451*a* on the upper edge of the button circuit board 45; when the abnormal external force acts on the door board 14, the mandrel 41 is sliding outward in the through hole 27, and the first compression spring 431 and second compression spring 432 rebound to force the axial column 443 of the first type flexible body 44A to move outwards, so as to make the first conductive sheet 444*a* firstly separate from the contact between the first contact 451*a* of the button circuit board 45 to form an open loop; if the external force continues to increase and move outward, the second conductive sheet 444*b* at the bottom will be disengaged from the contact with the second contact 451*b* of the button circuit board 45 to form an open loop state; if the external force still continues to move outward, the flange 413 of the mandrel 41 will continue to move outward until it is pressed against the top end of the second through hole 272.

Figure 5A:
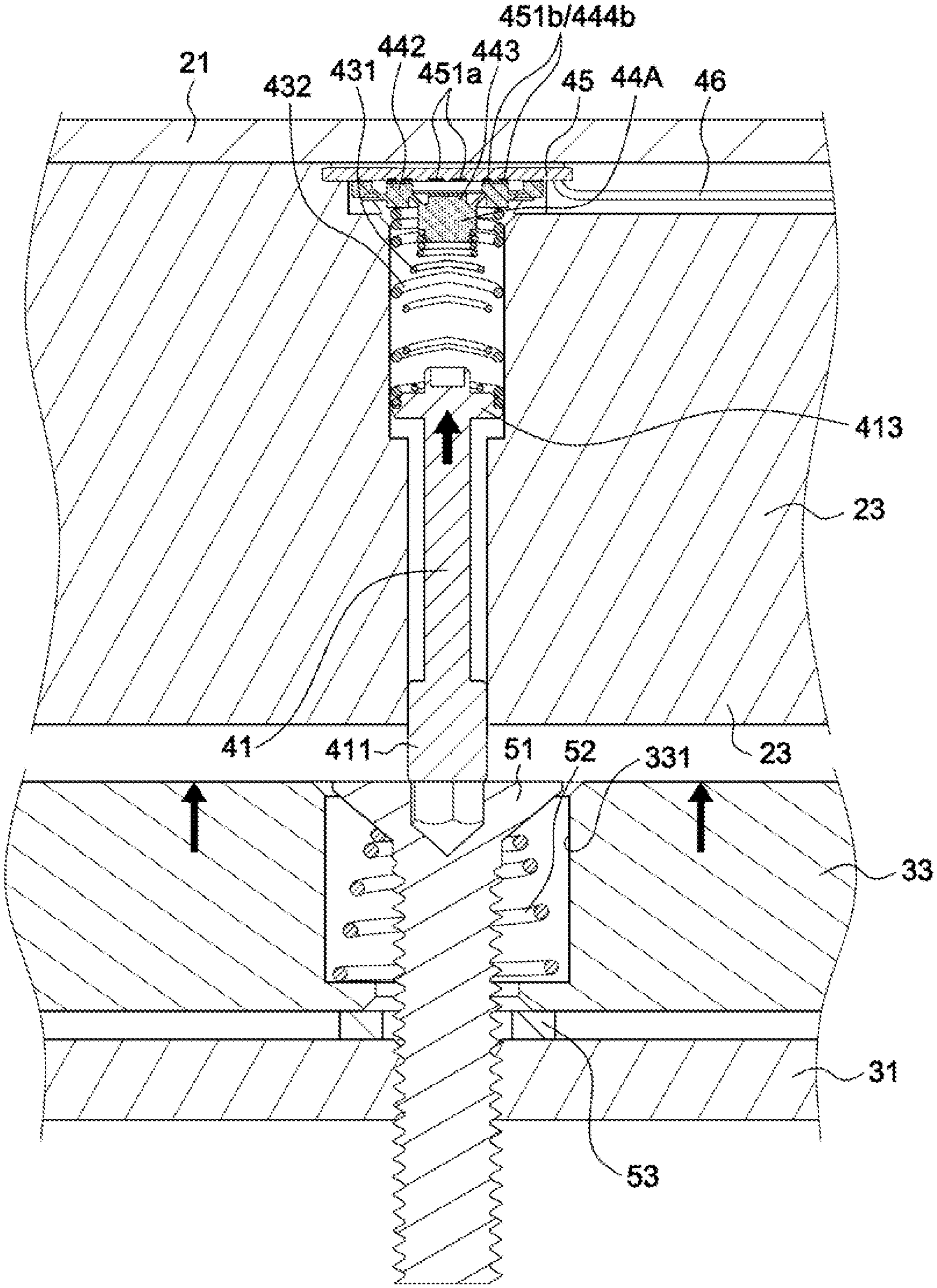
FIG. 5A is a schematic diagram illustrating the operation of the linkage sensing mechanism of the first embodiment of the present invention.
Figure 5B:
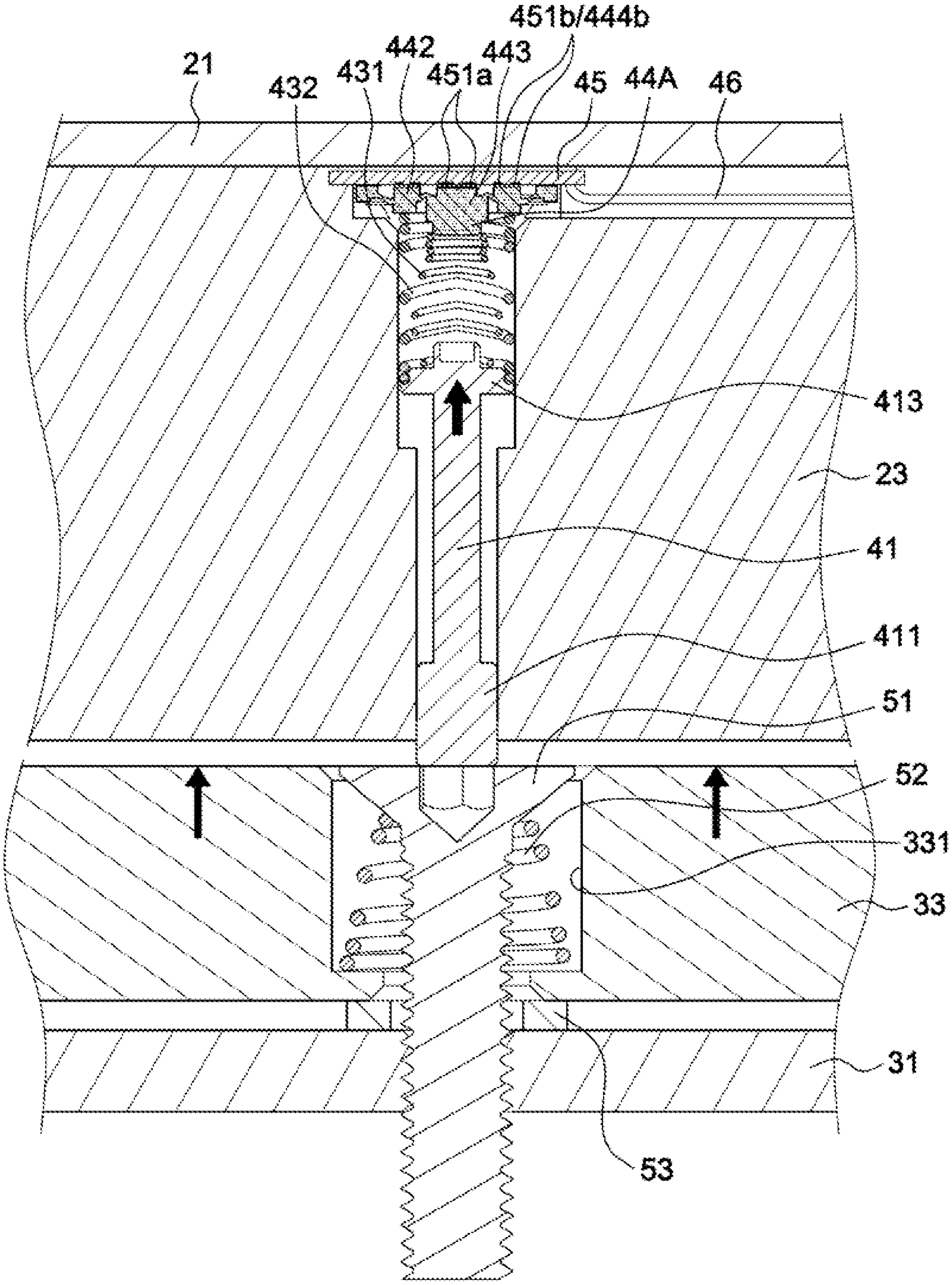
FIG. 5B is a schematic diagram illustrating the operation of the linkage sensing mechanism of the first embodiment of the present invention.
Figure 5C:
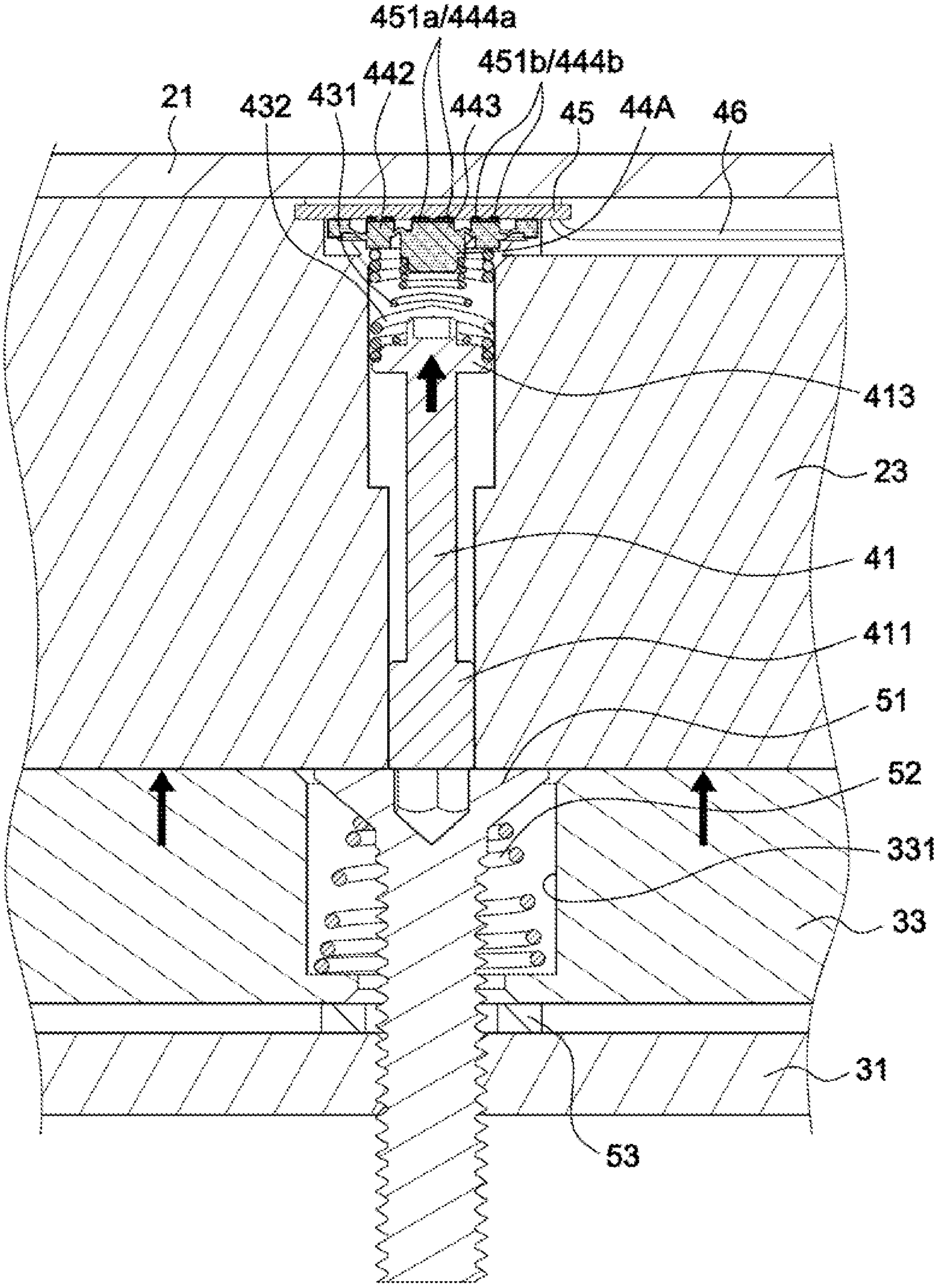
FIG. 5C is a schematic diagram illustrating the operation of the linkage sensing mechanism of the first embodiment of the present invention.

The linkage sensing mechanism 40 of the first embodiment, during the process of door closing, the door board 14 will gradually close into the door frame 13, the ejector head 411 is pushed inward by the head end of the positioning screw 51, then the flange 413 of the mandrel 41 is driven to compress the first compression spring 431 and the second compression spring 432, and force the first type flexible body 44A to move inwardly, then the second conductive sheet 444*b* at the bottom of the ring seat 442 contacts the second contact 451*b* of the button circuit board 45 first, and then the normal locking mode is activated, the control circuit board 25 energizes the electromagnet 23 with a high current to attract the iron plate 33, and the state is showing in FIG. 5A; then, the mandrel 41 continues to slide inward, the first conductive sheet 444*a* at the bottom of the axial column 443 then contacts the first contact 451*a* of the button circuit board 45, the power-saving locking mode is activated, and the control circuit board 25 is triggered immediately to change to supply power to the electromagnet 23 with a low current, at this time, there is still a gap between the electromagnet 23 and the iron plate 33, and the state is showing in FIG. 5B; then, when the ejector head 411 is pushed and slid by the head end of the positioning screw 51 and completely submerged in the electromagnet 23, at this time, the surfaces of the electromagnet 23 and the iron plate 33 are completely close, and the control circuit board 25 continues to supply power to the electromagnet 23 with a low current to keep the door closed, the state is showing in FIG. 5C.

Figure 5D:
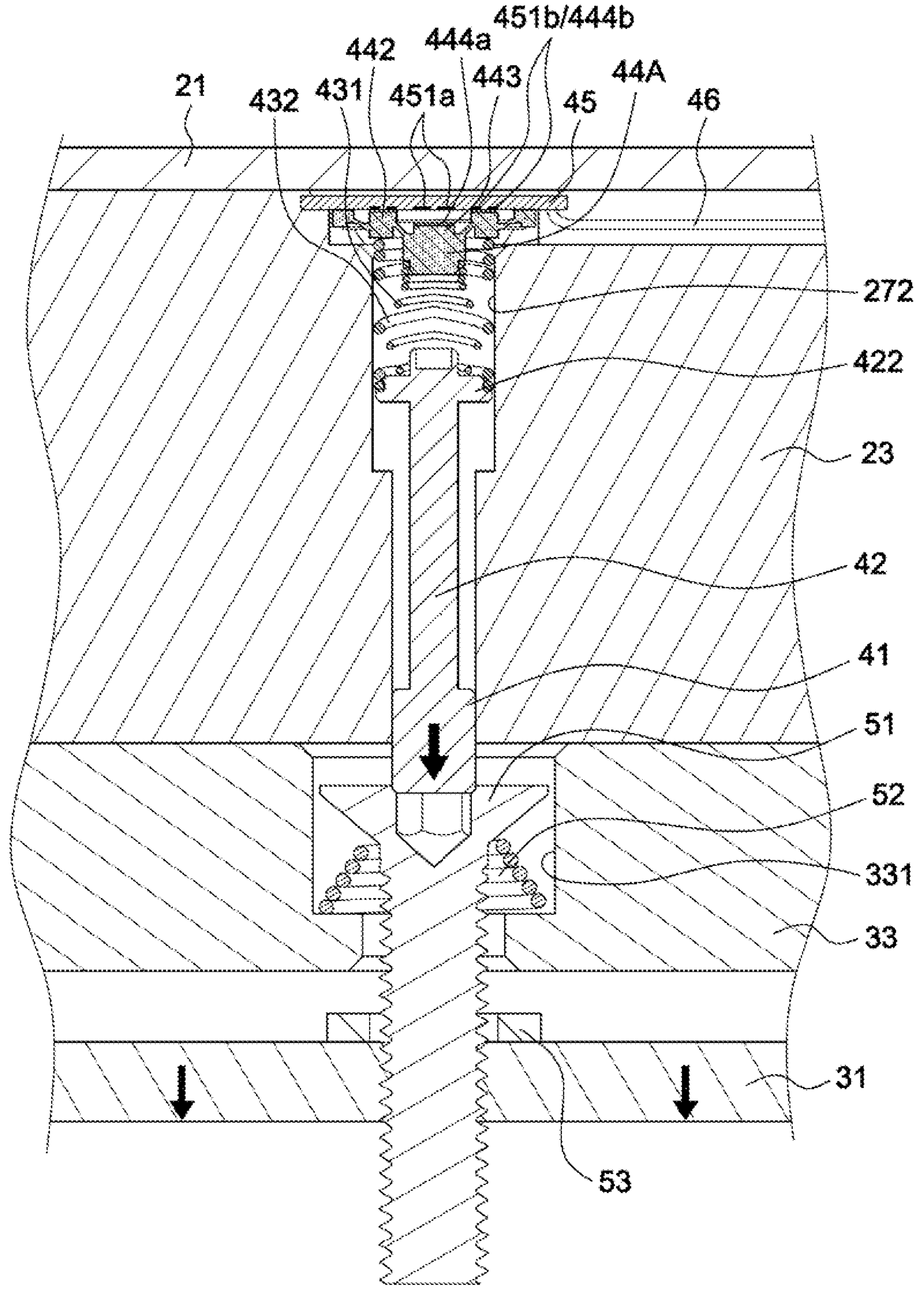
FIG. 5D is a schematic diagram illustrating the operation of the linkage sensing mechanism of the first embodiment of the present invention.

When the abnormal external force acts on the door board 14, the positioning seat 31 is pushed and drives the positioning screw 51 to move toward the opposite direction of the iron plate 33, so as to make the spring 52 bear the compression of the head end of the positioning screw 51; since the force that the positioning screw 51 push against the ejector head 411 getting smaller, the first compression spring 431 and second compression spring 432 rebound to force the ejector head 411 to move towards the direction of the slot 331 of the iron plate 33, at the same time, the axial column 443 of the first type flexible body 44A is displaced outward, so as to make the first conductive sheet 444*a* separate from the contact between the first contact 451*a* of the button circuit board 45, as FIG. 5D showing; at this time, the normal locking mode is activated, the control circuit board 25 supplies power to the electromagnet 23 with a high current, so as to resist the abnormal external force causing the iron plate 33 to break away from the adsorption of the electromagnet 23. If the external force does not disappear, the flange 413 of the mandrel 41 will continue to move outward until it is pressed against the top end of the second through hole 272; then, when the abnormal external force acting on the door board 14 disappears, the spring 52 will rebound and then drive the positioning seat 31 to drive the positioning screw 51 together with the door board 14 back to the original position, and the ejector head 411 will be pushed by the head end of the positioning screw 51 again and slide inward, the flange 413 of the mandrel 41 is driven to compress the first compression spring 431 and the second compression spring 432, and force the axial column 443 of the first type flexible body 44A to move inwardly, then the first conductive sheet 444*a* at the bottom contacts the first contact 451*a* of the button circuit board 45, and then the power-saving locking mode is activated, the control circuit board 25 returns to supply low current supply power to the electromagnet 23 to maintain the closed state of the door.

Figure 6A:
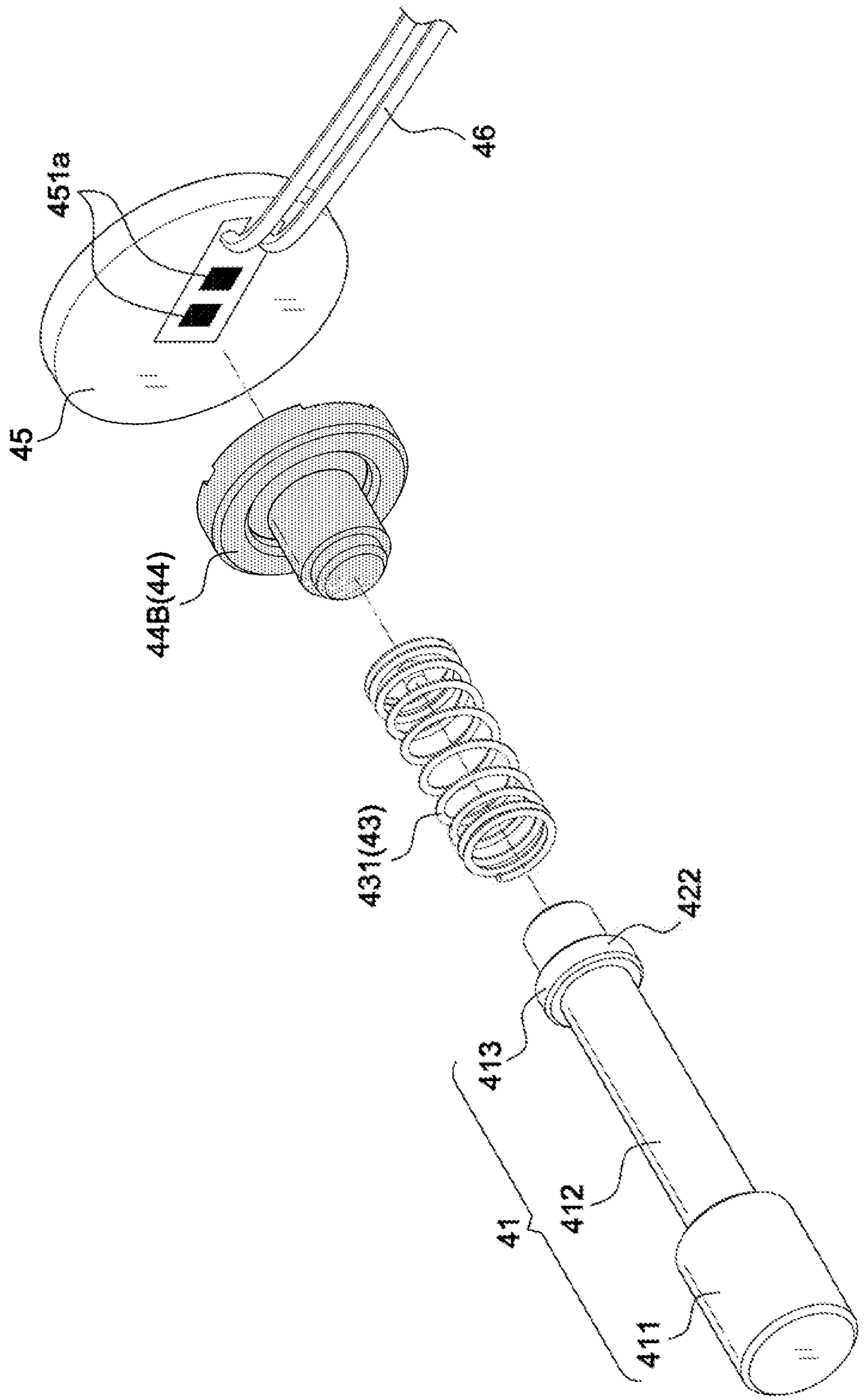
FIG. 6A is an exploded perspective views of the linkage sensing mechanism of the second embodiment of the present invention.
Figure 6B:
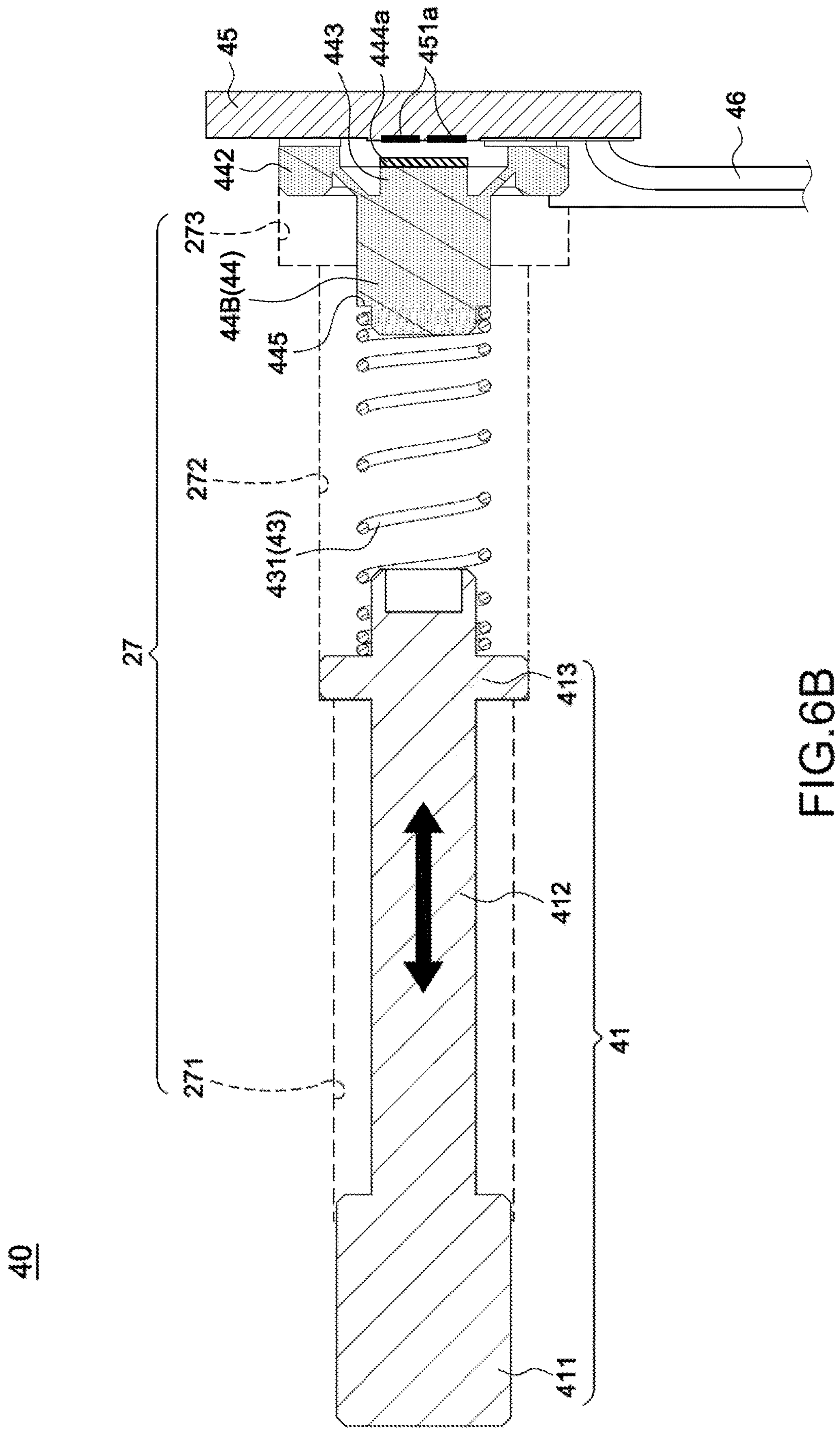
FIG. 6B is a sectional views of the linkage sensing mechanism of the second embodiment of the present invention.

The linkage sensing mechanism 40 of the second embodiment, as FIGS. 6A-6B showing, having a mandrel 41, a first compression spring 431, a second type flexible body 44B (power switch button 44), and a button circuit board 45, which are arranged in the through hole 27 of the electromagnet 23, and the through hole 27 includes a first through hole 271, a second through hole 272 and a third through hole 273; wherein the second type flexible body 44B is arranged in the second through hole 272 and the third through hole 273, and its upper end is provided with a first pushing surface 445 which can support the pressure of the first compression spring 431, its bottom has a ring seat 442 can stand at the top surface of the button circuit board 45, the center of the ring seat 442 has an axial column 443 of the first conductive sheet 444*a* which is dangly; the upper edge of the button circuit board 45 has a first contact 451*a* form an open loop, and is electrically connected to the control circuit board 25 by a wire 46; then, the mandrel 41 has an ejector head 411 and a flange 413, the ejector head 411 is set through the external side surface of the electromagnet 23, and can slide back and forth axially in the first through hole 271, the upper edge of the flange 413 is pressed against the top end of the second through hole 272, and the lower edge of the flange 413 presses the first compression spring 43 and make it enable to extend and retract axially in the second through hole 272; when the mandrel 41 is sliding inward in the through hole 27; when the mandrel 41 slides inward in the through hole 27, urging the flange 413 to compress the first compression spring 431 to force the second type flexible body 44B to move toward the direction of the button circuit board 45, so as to make the first conductive sheet 444*a* contact the first contact 451*a* to form a close loop. When the abnormal external force acts on the door board 14, the mandrel 41 is sliding outward in the through hole 27, and the first compression spring 431 rebound to force the axial column 443 of the second type flexible body 44B to move outwards, so as to make the first conductive sheet 444*a* separate from the contact between the first contact 451*a* of the button circuit board 45 to form an open loop; if the external force does not disappear, the flange 413 of the mandrel 41 will continue to move outward until it is pressed against the top end of the second through hole 272.

Figure 7A:
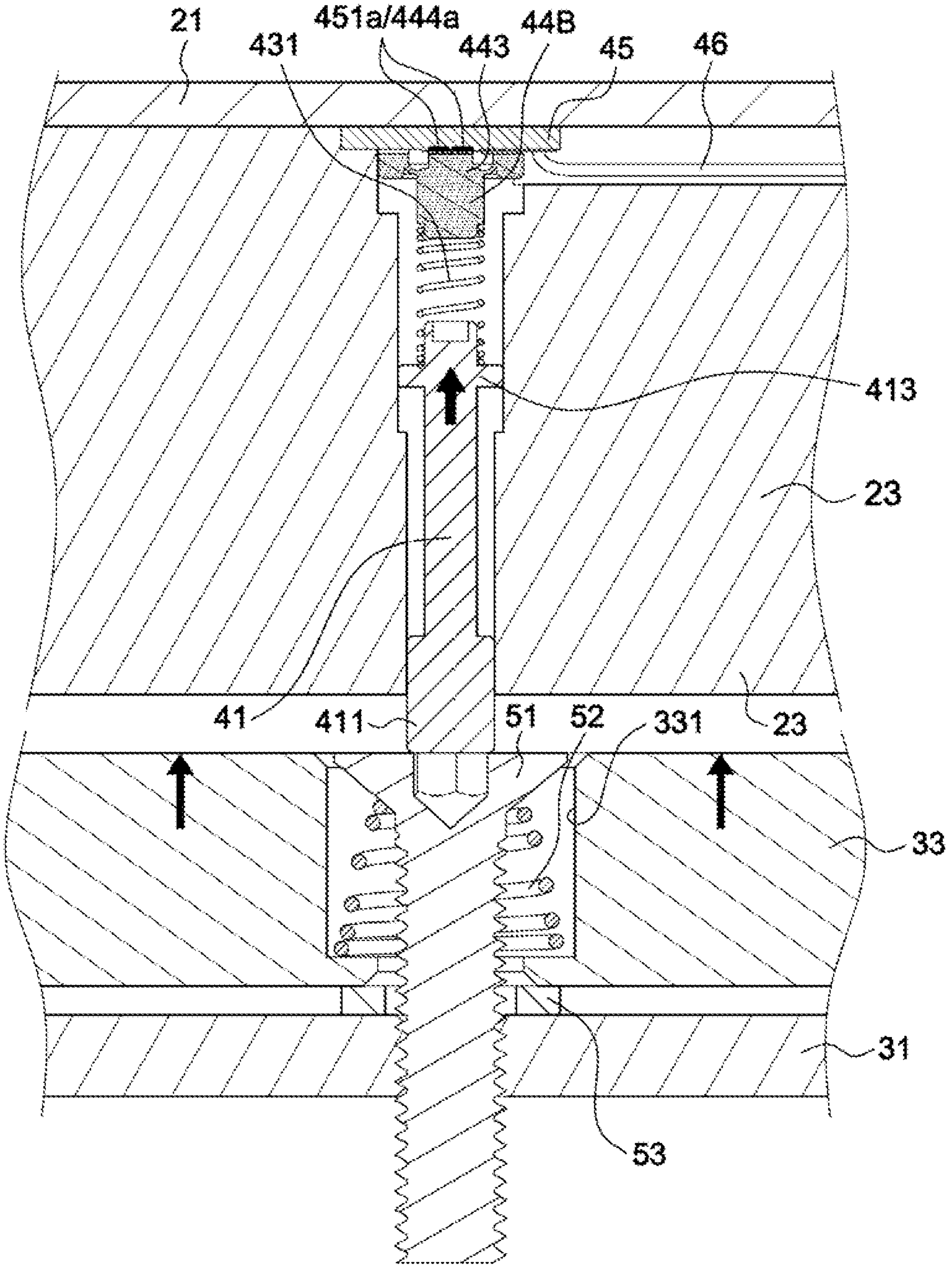
FIG. 7A is a schematic diagram illustrating the operation of the linkage sensing mechanism of the second embodiment of the present invention.
Figure 7B:
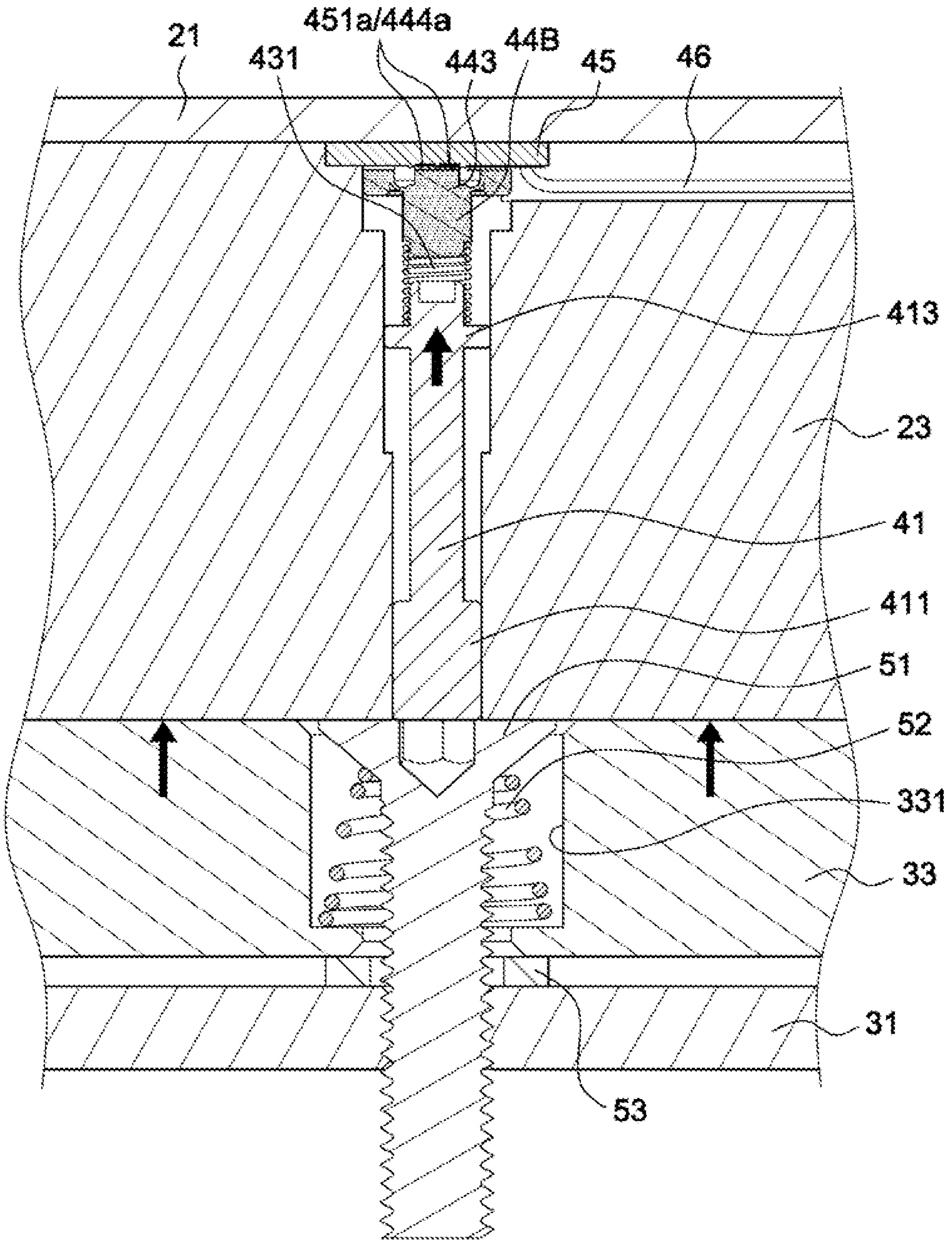
FIG. 7B is a schematic diagram illustrating the operation of the linkage sensing mechanism of the second embodiment of the present invention.
Figure 7C:
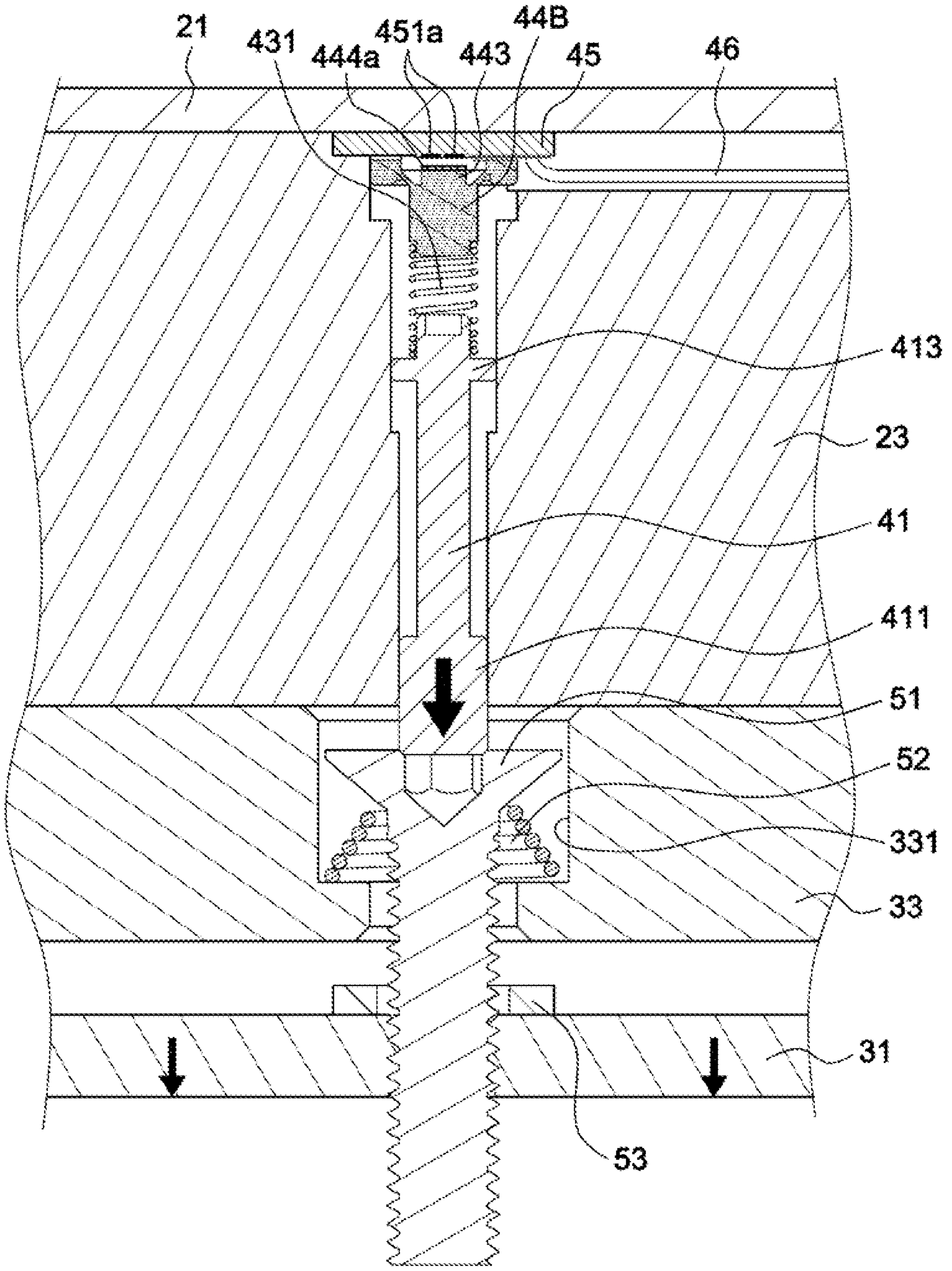
FIG. 7C is a schematic diagram illustrating the operation of the linkage sensing mechanism of the second embodiment of the present invention.

The linkage sensing mechanism 40 of the second embodiment, during the process of door closing, the door board 14 is gradually close into the door frame 13, the control circuit board 25 supplies power to the electromagnet 23 with a high current in the normal locking mode to attract the iron plate 33; the door board 14 keeping close into the door frame 13, the ejector head 411 is pushed inward by the head end of the positioning screw 51, then the flange 413 of the mandrel 41 is driven to compress the first compression spring 431 and force the axial column 443 of the second type flexible body 44B to move inwardly, then the first conductive sheet 444*a* contacts the first contact 451*a* of the button circuit board 45 first, and then the power-saving locking mode is activated, the control circuit board 25 is triggered immediately to change the power supply to the electromagnet 23 with a low current, at this time, there is still a gap between the electromagnet 23 and the iron plate 33, as FIG. 7A showing; then, when the ejector head 411 is pushed and slid by the head end of the positioning screw 51 and completely submerged in the electromagnet 23, at this time, the surfaces of the electromagnet 23 and the iron plate 33 are completely close, and the control circuit board 25 continues to supply power to the electromagnet 23 with a low current to keep the door closed, the state is showing in FIG. 7B; when the abnormal external force acts on the door board 14 during the power-saving locking mode, the positioning seat 31 is pushed and drives the positioning screw 51 to move toward the opposite direction of the iron plate 33, so as to make the spring 52 bear the compression of the head end of the positioning screw 51; since the force that the positioning screw 51 push against the ejector head 411 getting smaller, the first compression spring 431 rebounds to force the mandrel 41 push the ejector head 411 to move towards the direction of the slot 331 of the iron plate 33, at the same time, the axial column 443 of the second type flexible body 44B is displaced outward, so as to make the first conductive sheet 444*a* separate from the contact between the first contact 451*a* of the button circuit board 45, as FIG. 7C showing; at this time, the normal locking mode is activated, the control circuit board 25 supplies power to the electromagnet 23 with a high current, so as to resist the abnormal external force causing the iron plate 33 to break away from the adsorption of the electromagnet 23. If the external force does not disappear, the flange 413 of the mandrel 41 will continue to move outward until it is pressed against the top end of the second through hole 272; then, when the abnormal external force acting on the door board 14 disappears, the spring 52 will rebound and then drive the positioning seat 31 to drive the positioning screw 51 together with the door board 14 back to the original position, and the ejector head 411 will be pushed by the head end of the positioning screw 51 again and slide inward, the flange 413 of the mandrel 41 is driven to compress the first compression spring 431 to force the axial column 443 of the second type flexible body 44B to move inwardly, then the first conductive sheet 444*a* at the bottom contacts the first contact 451*a* of the button circuit board 45, and then the power-saving locking mode is activated, the control circuit board 25 returns to supply low current supply power to the electromagnet 23 to maintain the closed state of the door.

The spring 52 of the clutch mechanism 50 is set in the slot 331 of the iron plate 33, the positioning screw 51 set through the spring 52 the slot 331 and then screwed with the positioning seat 31, and the clutch mechanism 50 is set corresponding to the linkage sensing mechanism 40; wherein, the main function of the spring 52 is that when an abnormal external force acts on the door board 14, the positioning seat 31 will drive the positioning screw 51 to displace for making the spring 52 bear the compression of the head end, and make the ejector head 411 of the linkage sensing mechanism 40 slide toward the direction of the slot 331; when the abnormal external force disappears, the spring 52 will rebound and then drive the positioning seat 31 to drive the positioning screw 51 back to its original position; obviously, the purpose of setting the spring 52 is to use its rebound force to make the positioning screw 51 return to its original position, thereby pushing the ejector head 411 of the linkage sensing mechanism 40 to reversely slide; therefore, the spring 52 is not an absolute choice, if a door closer is installed between the door board 14 and the door frame 13, the spring 52 does not need to be installed, and the door closer can also apply its closing force to make the positioning screw 51 return to the original position; in other words, whether it is a door closer or other related components, as long as the positioning screw 51 can be returned to its original position, the arrangement of the spring 52 in the clutch mechanism 50 can be replaced.

Figure 8:
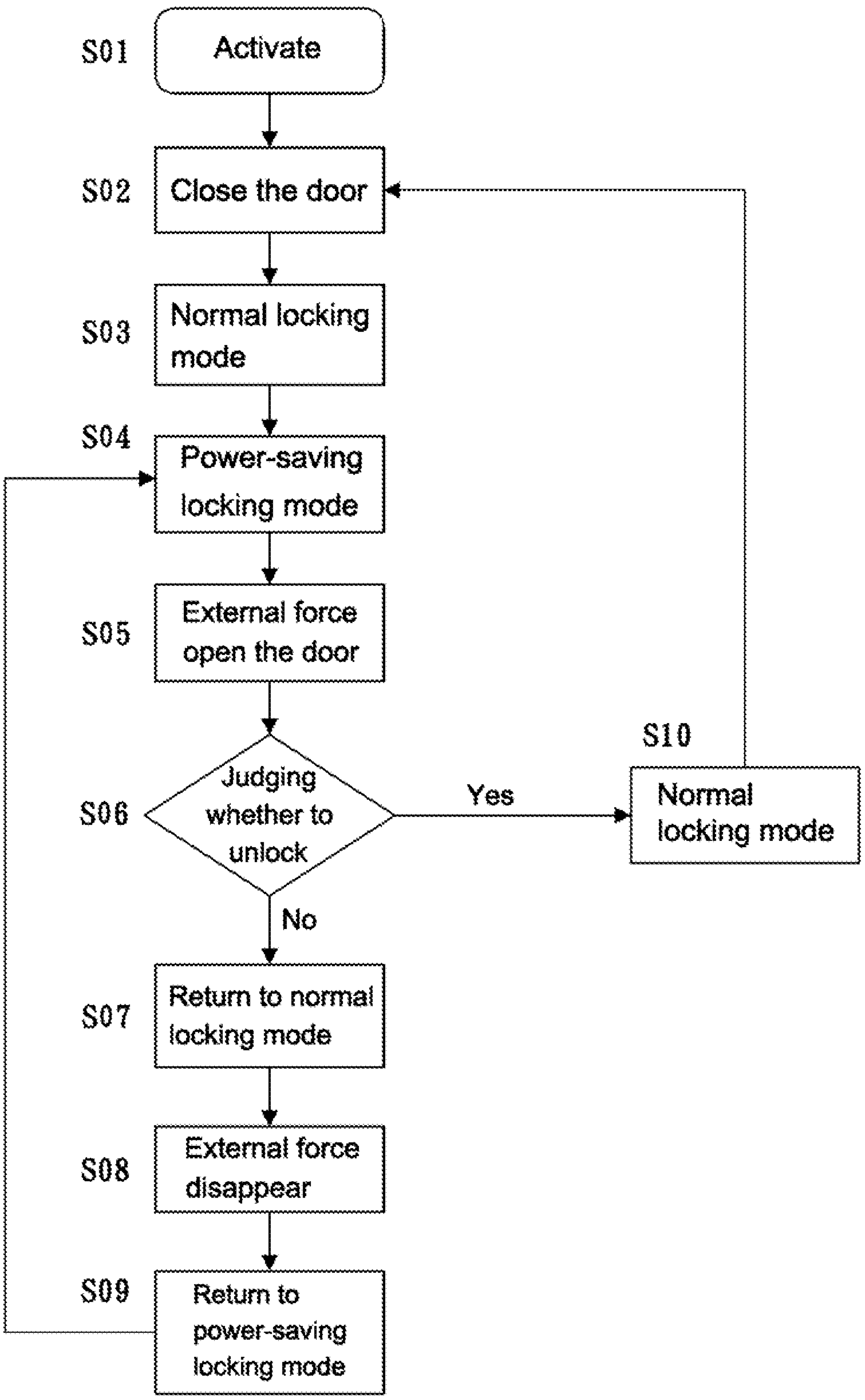
FIG. 8 is a schematic diagram illustrating the operating step of the control circuit board of the present invention.

Referring to FIG. 8, which is the operation step of the control circuit board of the present invention; S01: Activate, wherein, the electromagnet assembly 20 and the linkage sensing mechanism 40 are installed on the door frame 13, and the adsorption assembly 30 and the clutch mechanism 50 are correspondingly installed on the door board 14, as showing in FIG. 3C; S02: Close the door, the door board 14 will be closed into the door frame 13; S03: Normal locking mode, at this time, the door board 14 gradually closes into the door frame 13, and in the second embodiment of the linkage sensing mechanism 40, the control circuit board 25 supplies power to the electromagnet 23 with a high current to attract the iron plate 33; in the first embodiment of the linkage sensing mechanism 40, the mandrel 41 slides inwards in the through hole 27 of the electromagnet 23, and the flange 413 of the mandrel 41 is driven to compress the first compression spring 431 and the second compression spring 432, and forcing the second conductive sheet 444*b* at the bottom of the ring seat 442 of the first type flexible body 44A to contact the second contact 451*b* of the button circuit board 45 first, then the control circuit board 25 supply power to the electromagnet 23 with a high current to attract the iron plate 33, as showing in FIG. 5A; S04: Power-saving locking mode, the mandrel 41 slides inwards in the through hole 27 of the electromagnet 23, the first conductive sheet 444*a* at the bottom of the ring seat 442 of the first type flexible body 44A and the second type flexible body 44B to contact the first contact 451*a* of the button circuit board 45, then the control circuit board 25 change the power supply to the electromagnet 23 with a low current to maintain the closed state of the door board, as showing in FIGS. 5B and 7A; S05: External force open the door, at this time, the door board 14 bears the force of door opening, because the control circuit board 25 is still energized to the electromagnet 23, so the electromagnetic door lock is still locked; S06: Judging whether to unlock, if yes, go to S10, if no, go to S07.

Furthermore, S07: Return to normal locking mode, at this time, an abnormal external force acts on the door board 14, the electromagnet 23 and the iron plate 33 are still in close contact, but the door board 14 is pushed by the external force, then the positioning seat 31 will drive the positioning screw 51 to display to the opposite direction of the iron plate 33, since the force of the positioning screw 51 against the ejector head 411 is reduced, the first compression spring 431 and the second compression spring 432 are rebounded, and making the first conductive sheet 444*a* of the axial column 443 of the first type flexible body 44A and second type flexible body 44B be separated from the contact with the first contact 451*a* of the button circuit board 45, then the control circuit board 25 returns to supply high current power to the electromagnet 23 to resist the abnormal external force that causing the iron plate 33 break away from the adsorption of the electromagnet 23, as FIGS. 5D and 7C showing; S08: External force disappear, when the abnormal force acting on the door board 14 disappears, the rebound of the spring 52 will drive the positioning seat 31 together with the door board 14 to return to its original position; S09: Returning to power-saving mode, the positioning seat 31 return to the original position, the ejector head 411 will be pushed by the head end of the positioning screw 51 again and slide inward, the flange 413 of the mandrel 41 is driven to compress the first compression spring 431 and the second compression spring 432 to force the axial column 443 of the first type flexible body 44A the second type flexible body 44B to move inwardly, then the first conductive sheet 444*a* at the bottom contacts the first contact 451*a* of the button circuit board 45, and then the control circuit board 25 returns to supply low current supply power to the electromagnet 23 to maintain the closed state of the door; S10: Normal unlocking mode, which is a normal unlocking action, at this time, the control circuit board 25 will cut off the power supply to the electromagnet 23, and the iron plate 33 will be separate from the adsorption of the electromagnet 23, so the door board 14 can be opened.

Since the door lock with energy-saving device of the present invention is aimed at the electromagnetic door lock that originally needs continuous power supply around the clock, the clutch mechanism 50 is combined with the linkage sensing mechanism 40 to trigger the control circuit board 25 to supply power, when the normal state is reached, provide a low current; when the abnormal external force acts, quickly changes into a high current state, so that the electromagnetic door lock has the effect of energy saving and preventing abnormal external force. Furthermore, the present invention has a power switch button 44 with flexibility to cooperate with the action of the compression spring assembly 43, so as to has the effect of amplifying the buffer, and make process of the contact (forming a closed loop) and the separation (forming open loop) of the conductive sheet assembly 444 with the button circuit board 45 to achieve precise control in timing.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A door lock with an energy saving device, the door lock comprising:

an electromagnet assembly having a locking recess, an electromagnet and a control circuit board, the locking recess is securable in a door frame, the electromagnet has a through hole, the through hole which is set inside of the locking recess, the control circuit board is arranged inside a containing space of the locking recess, the control circuit board using a wire to connect an external power supply, and the control circuit board electrically connected to the electromagnet;

an adsorption assembly having a positioning unit and an iron plate, the positioning unit is for securing on a door board, the iron plate has a slot the iron plate is pivoted on the positioning unit;

a linkage sensing mechanism is arranged in the through hole of the electromagnet, the linkage sensing mechanism having a mandrel, a compression spring assembly, a power switch button, and a button circuit board, wherein the bottom of the power switch button has at least one conductive sheet assembly, the top edge of the control circuit board has a least one contact to form an open loop, and the at least one contact electrically connected to the control circuit board, the mandrel has an ejector head and a flange, the mandrel is enabled to axially slide in the through hole of the electromagnet, the ejector head is set through the external side of the electromagnet, the flange is enabled to compress the compression spring assembly to make it axially stretch, when the mandrel is sliding inward, thereby urging the flange to compress the compression spring assembly to force the power switch button to move towards the direction of the button circuit board, so the conductive sheet assembly will contact the contact of the button circuit board to form a close loop, and when the mandrel is sliding outward, the compression spring assembly rebound to force the power switch button to move away from the direction of the button circuit board, so the conductive sheet assembly will separate from the contact of the button circuit board to form an open loop;

a clutch mechanism is assembled in the adsorption assembly, the clutch mechanism corresponding to the linkage sensing mechanism, the clutch mechanism having a positioning screw and a spring, the spring is assembled in the slot of the iron plate, and the positioning screw set through the spring and is screwed with the positioning unit, so that the positioning unit is enable to displace toward the opposite direction of the iron plate under the action of external force, and drixe the positioning screw to compress the spring, and when the external force disappears, the spring will rebound and drive the positioning unit to return to its original position; and the operation of the door lock consists of the following steps:

Step a) Start the normal locking mode: when closing the door board to the door frame, the control circuit board supplies power to the electromagnet with the high current of the normal locking mode to attract the iron plate;

Step b) Start the power-saving locking mode, the clutch mechanism will drive the linkage sensing mechanism to act, and trigger the control circuit board to change the power supply to the electromagnet with the low current of the power-saving locking mode to maintain the closed state of the door board;

Step c) When the abnormal external force acts on the door board, the positioning unit of the clutch mechanism is pushed, and the power switch button of the linkage sensing mechanism is driven to move away from the button circuit board, so that the contact of the button circuit board forms an open loop, the control circuit board is triggered to supply the electromagnet with the high current of the normal locking mode to resist the external force;

Step d) When the abnormal external force disappears, the positioning unit of the clutch mechanism is moved back to its original position making the power switch button of the linkage sensing mechanism move toward the direction of the button circuit board, so that the contact of the button circuit board forms a closed loop, and the control circuit board will restore the low current power supply to the electromagnet in the power-saving locking mode, so that the door board continues to maintain the closed state.

2. The door lock with energy saving device as claimed in claim 1, including a first type flexible body, the first type flexible body has a ring seat, the center of the ring seat has an axial column which is dangly, and the conductive sheet assembly which arranged at the bottom of the axial column and the ring seat is composed of a first conductive sheet and a second conductive sheet annularly arranged on the outer periphery of the first conductive sheet, and the upper end of the first type flexible body is provided with a first pushing surface and a second pushing surface which are respectively located at the top of the axial column and the ring seat; the compression spring assembly is composed of a first compression spring and a second compression spring annularly arranged on the outer periphery of the first compression spring, its one end is against the outer periphery of the flange of the mandrel, and the other end is against the first pushing surface and the second pushing surface; when the mandrel is sliding inward in the through hole, urging the flange to compress the first compression spring and second compression spring to force the ring seat and the axial column of the first type flexible body to move inwards, so as to make the second conductive sheet and the first conductive sheet successively contact the second contact and the first contact on the upper edge of the button circuit board; and when the mandrel is sliding outward in the through bole, make the flange to against the top end of a second through hole, and the first compression spring and second compression spring rebound to force the axial column of the first type flexible body to move outwards, so as to make the first conductive sheet firstly separate from the contact between the first contact of the button circuit board to form an open loop.

3. The door lock with energy saving device as claimed in claim 1, including a second type flexible body, the second type flexible body has a ring seat, the center of the ring seat has an axial column which is dangly, and the conductive sheet assembly which arranged at the bottom of the axial column and the ring seat is composed of a first conductive sheet, and the upper end of the second type flexible body is provided with a first pushing surface located at the top of the axial column; the compression spring assembly is composed of a first compression spring, its one end is against the outer periphery of the flange of the mandrel, and the other end is against the first pushing surface; when the mandrel is sliding inward in the through hole, urging the flange to compress the first compression spring to force the second type flexible body to move toward the direction of button circuit board, so as to make the first conductive sheet contact the first contact of the button circuit board to form a close loop; and when the mandrel is sliding outward in the through hole, the first compression spring rebound to force the second type flexible body to move away from the direction of button circuit board, so as to make the first conductive sheet separate from the contact between the first contact of the button circuit board to form an open loop.

4. The door lock with energy saving device as claimed in claim 1, wherein the positioning unit is a positioning seat, the positioning seat is secured at the inner side of the door board, the positioning screw is set through the sprint and screwed with the positioning seat, and make the iron plate pivot to the outer periphery of the positioning seat.

5. The door lock with energy saving device as claimed in claim 4, wherein the clutch mechanism further comprise an elastic body arranged between the positioning seat and the iron plate, and after the positioning screw is set through the spring, the positioning screw is further set through the elastic body and then screwed with the positioning seat, so as to make the elastic body has both buffering and positioning effects.

6. The door lock with energy saving device as claimed in claim 1, wherein the positioning unit is an internal screw, the internal screw is secured at the inner side of the door hoard, the positioning screw is set through the spring and screwed with the internal screw, and make the iron plate pivot to the outer periphery of the internal screw.

7. The door lock with energy saving device as claimed in claim 6, wherein the clutch mechanism further comprise an elastic body arranged between the internal screw and the iron plate, and after the positioning screw is set through the springs, the positioning screw is further set through the elastic body and then screwed with the internal screw, so as to make the elastic body, has both buffering and positioning effects.

* * * * *